United States Patent
Conary et al.

[19]

[11] Patent Number: 5,935,253
[45] Date of Patent: Aug. 10, 1999

[54] METHOD AND APPARATUS FOR POWERING DOWN AN INTEGRATED CIRCUIT HAVING A CORE THAT OPERATES AT A SPEED GREATER THAN THE BUS FREQUENCY

[75] Inventors: James W. Conary, Aloha; John A. Deetz, Beaverton, both of Oreg.

[73] Assignee: Intel Corporation, Santa Clara, Calif.

[21] Appl. No.: 08/868,747

[22] Filed: Jun. 4, 1997

Related U.S. Application Data

[63] Continuation of application No. 08/036,627, Mar. 24, 1993, abandoned, which is a continuation-in-part of application No. 07/778,575, Oct. 17, 1991, abandoned.

[51] Int. Cl.⁶ .................................................. G06F 1/26
[52] U.S. Cl. ............................................................ 713/322
[58] Field of Search ........................... 395/750.21–750.08

[56] References Cited

U.S. PATENT DOCUMENTS

| | | |
|---|---|---|
| 3,623,017 | 11/1971 | Lowell . |
| 3,715,729 | 2/1973 | Mercy . |
| 3,895,311 | 7/1975 | Basse et al. . |
| 3,919,695 | 11/1975 | Gooding . |
| 3,931,585 | 1/1976 | Barker et al. . |
| 3,936,762 | 2/1976 | Cox, Jr. et al. . |
| 4,077,016 | 2/1978 | Sanders et al. . |
| 4,095,267 | 6/1978 | Morimoto . |
| 4,145,761 | 3/1979 | Gunter et al. ........................ 365/227 |
| 4,203,153 | 5/1980 | Boyd . |
| 4,264,863 | 4/1981 | Kojima . |
| 4,293,927 | 10/1981 | Hoshii . |

(List continued on next page.)

FOREIGN PATENT DOCUMENTS

| | | |
|---|---|---|
| 103755 A2 | 3/1984 | European Pat. Off. . |
| 0140814 A3 | 5/1985 | European Pat. Off. . |

(List continued on next page.)

OTHER PUBLICATIONS

–Patent Office translation for "Notice of the Reason for Refusal," patent application No. 297630/'93 (Dec. 16, 1997).

IBM Technical Disclosure Bulletin, vol. 33, No. 6B, Nov. 1990, New York, "Multiple Phase Clock Generation From a Single Oscillator," pp. 322–325.

Wescon/89 Conference Record, Nov. 14, 1989, San Francisco, CA, "the FL86C020 RISC with On–board Cache," pp. 251–254.

Case, Brian. "R4000 Extends R3000 Architecture", *Microprocessor Report*, vol. v5n19, Oct. 16, 1991.

Slater, Michael. "MIPS Previews 64–Bit R4000 Architecture", *Microprocessor Report*, vol. v522, Feb. 6, 1991, pp. p1(6).

Wilson, John. "MIPS Rethinks RICS with Superpipelining", *Computer Design*, vol. v30n3, Feb. 1, 1991, pp. p28(3).

(List continued on next page.)

*Primary Examiner*—Ayaz R. Sheikh
*Assistant Examiner*—David A. Wiley
*Attorney, Agent, or Firm*—Blakely, Sokoloff, Taylor & Zafman

[57] ABSTRACT

A method and apparatus for reducing the power consumption of an integrated circuit when the core logic of the integrated circuit is in the quiescent or idle state. The method and apparatus includes a phase locked loop (PLL) circuit for generating an internal clock, wherein the frequency of the internal clock is at a predetermined multiple of the frequency of the global clock signal. When the integrated circuit is quiescent, the present invention provides circuitry which permits the internal clock to be slowed to a lower frequency or the internal clock to be frozen to reduce power consumption.

35 Claims, 10 Drawing Sheets

U.S. PATENT DOCUMENTS

| | | |
|---|---|---|
| 4,300,019 | 11/1981 | Toyomaki . |
| 4,365,290 | 12/1982 | Nelms et al. . |
| 4,405,898 | 9/1983 | Flemming . |
| 4,479,191 | 10/1984 | Nojima et al. . |
| 4,545,030 | 10/1985 | Kitchin . |
| 4,615,005 | 9/1986 | Maejima et al. . |
| 4,639,864 | 1/1987 | Katzman et al. . |
| 4,667,289 | 5/1987 | Yoshida et al. . |
| 4,669,099 | 5/1987 | Zinn . |
| 4,694,393 | 9/1987 | Hirano et al. ............................ 395/750 |
| 4,698,748 | 10/1987 | Juzswik et al. . |
| 4,758,945 | 7/1988 | Remedi . |
| 4,766,567 | 8/1988 | Kato . |
| 4,780,843 | 10/1988 | Tietjen . |
| 4,814,591 | 3/1989 | Nara et al. . |
| 4,823,292 | 4/1989 | Hillion . |
| 4,841,440 | 6/1989 | Yonezu et al. . |
| 4,881,205 | 11/1989 | Aihara . |
| 4,896,260 | 1/1990 | Hyatt . |
| 4,907,183 | 3/1990 | Tanaka . |
| 4,922,450 | 5/1990 | Rose et al. . |
| 4,931,748 | 6/1990 | McDermott et al. ...................... 331/1 |
| 4,935,863 | 6/1990 | Calvas et al. . |
| 4,967,895 | 11/1990 | Speas ..................................... 194/200 |
| 4,979,097 | 12/1990 | Triolo et al. . |
| 4,980,836 | 12/1990 | Carter ..................................... 395/750 |
| 4,991,129 | 2/1991 | Swartz . |
| 5,021,679 | 6/1991 | Fairbanks et al. . |
| 5,025,387 | 6/1991 | Frane . |
| 5,058,203 | 10/1991 | Inagami ................................... 455/89 |
| 5,059,924 | 10/1991 | JenningsCheck . |
| 5,077,686 | 12/1991 | Rubinstein . |
| 5,083,266 | 1/1992 | Watanabe . |
| 5,103,114 | 4/1992 | Fitch . |
| 5,123,107 | 6/1992 | Mensch, Jr. . |
| 5,129,091 | 7/1992 | Yorimoto et al. . |
| 5,133,064 | 7/1992 | Hotta et al. . |
| 5,151,992 | 9/1992 | Nagae . |
| 5,167,024 | 11/1992 | Smith et al. . |
| 5,175,845 | 12/1992 | Little . |
| 5,210,858 | 5/1993 | Jensen et al. . |
| 5,220,672 | 6/1993 | Nakao et al. . |
| 5,239,652 | 8/1993 | Seibert et al. . |
| 5,249,298 | 9/1993 | Bolan et al. . |
| 5,251,320 | 10/1993 | Kuzawinski et al. . |
| 5,319,771 | 6/1994 | Takeda . |
| 5,336,939 | 8/1994 | Eitrheim et al. . |
| 5,355,502 | 10/1994 | Schowe et al. ........................ 395/750 |
| 5,359,232 | 10/1994 | Eitrheim et al. . |
| 5,473,767 | 12/1995 | Kardach et al. ........................ 395/550 |
| 5,560,001 | 9/1996 | Kardach et al. ........................ 395/550 |
| 5,560,002 | 9/1996 | Kardach et al. ........................ 395/550 |
| 5,630,143 | 5/1997 | Maher et al. .......................... 395/750 |
| 5,632,037 | 5/1997 | Maher et al. .......................... 395/750 |
| 5,634,117 | 5/1997 | Conary et al. . |

FOREIGN PATENT DOCUMENTS

| | | |
|---|---|---|
| 0167853 | 6/1985 | European Pat. Off. . |
| 0242010 | 12/1987 | European Pat. Off. . |
| 0366326 | 10/1989 | European Pat. Off. . |
| 0385567 | 1/1990 | European Pat. Off. . |
| 0366250 A1 | 5/1990 | European Pat. Off. . |
| 0368144A2 | 5/1990 | European Pat. Off. . |
| 0419908A2 | 4/1991 | European Pat. Off. . |
| 0451661A2 | 10/1991 | European Pat. Off. . |
| 0451661A3 | 10/1991 | European Pat. Off. . |
| 451661 | 10/1991 | European Pat. Off. . |
| 0478132A1 | 4/1992 | European Pat. Off. . |
| 5981720 | 5/1984 | Japan . |
| 1131934 | 5/1989 | Japan . |
| 3161815 | 7/1991 | Japan . |
| 4148403 | 5/1992 | Japan . |
| 2010551 | 6/1979 | United Kingdom . |
| 2130765 | 6/1984 | United Kingdom . |

OTHER PUBLICATIONS

Intel Automotive Components Handbook "Power–On Reset", 1988, pp. 10–24 & 10–25.

Motorola MC6802032 –Bit Microprocessor User's Manual, 3rd Edition, 1990, pp. 1–3.

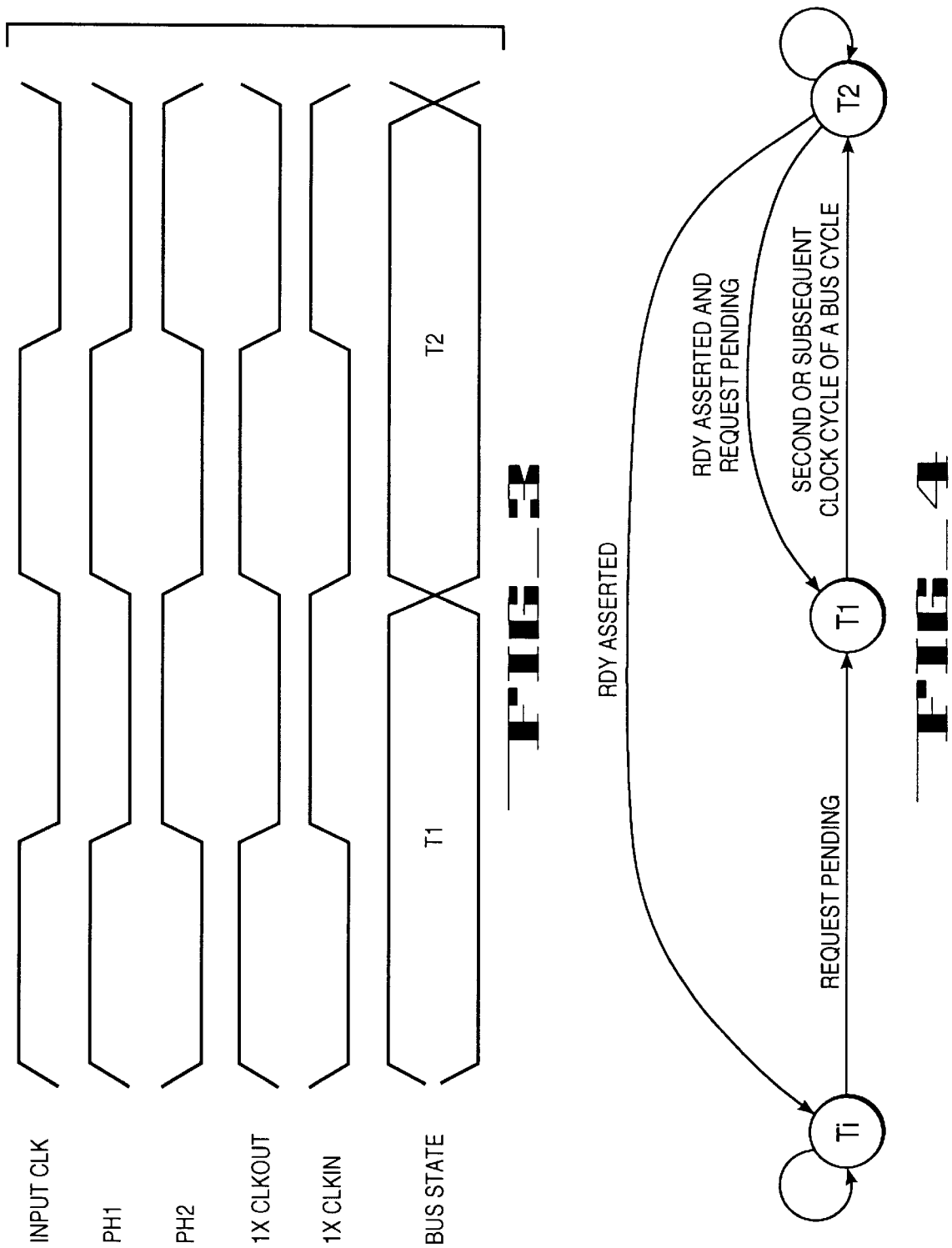

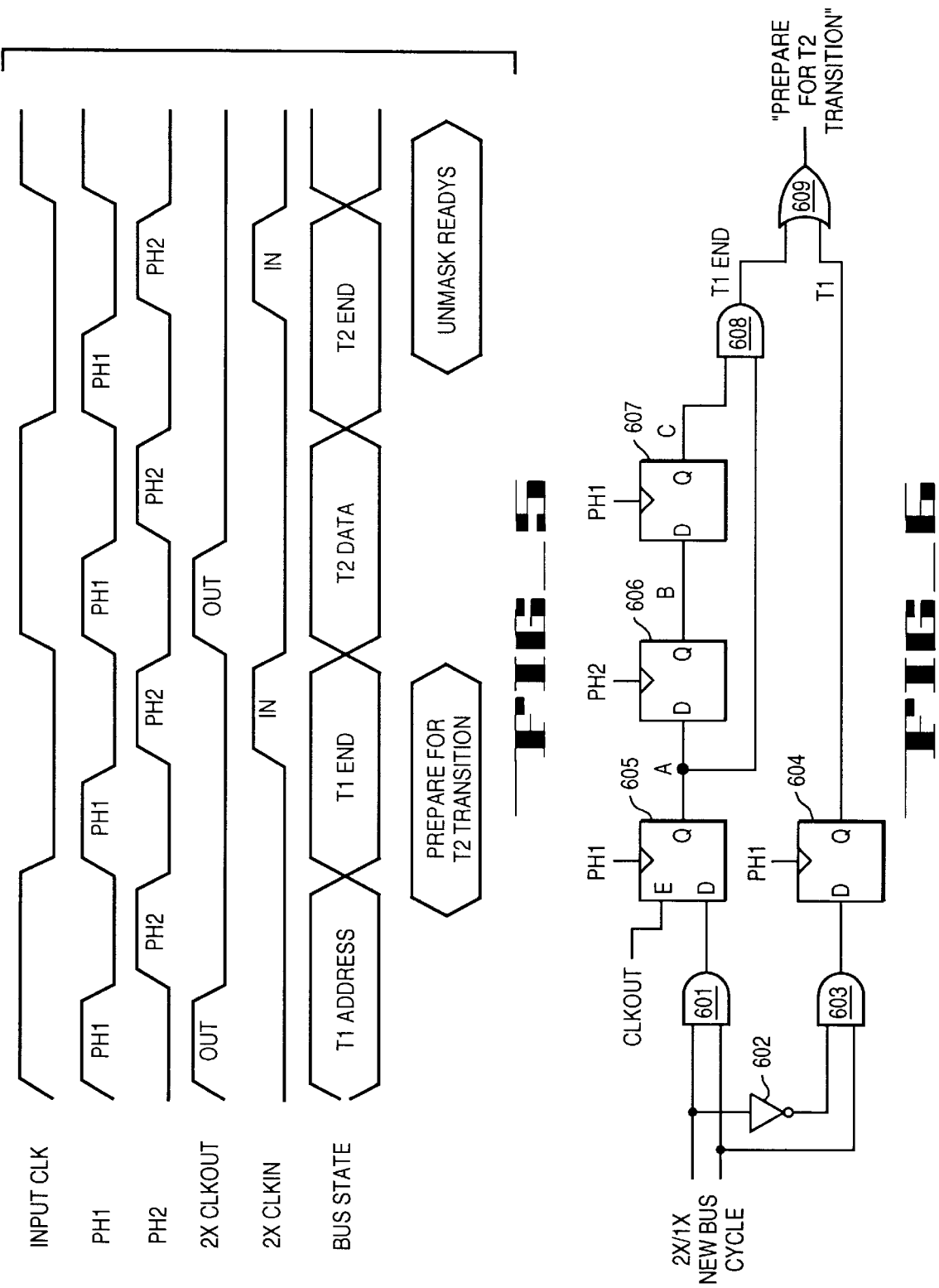

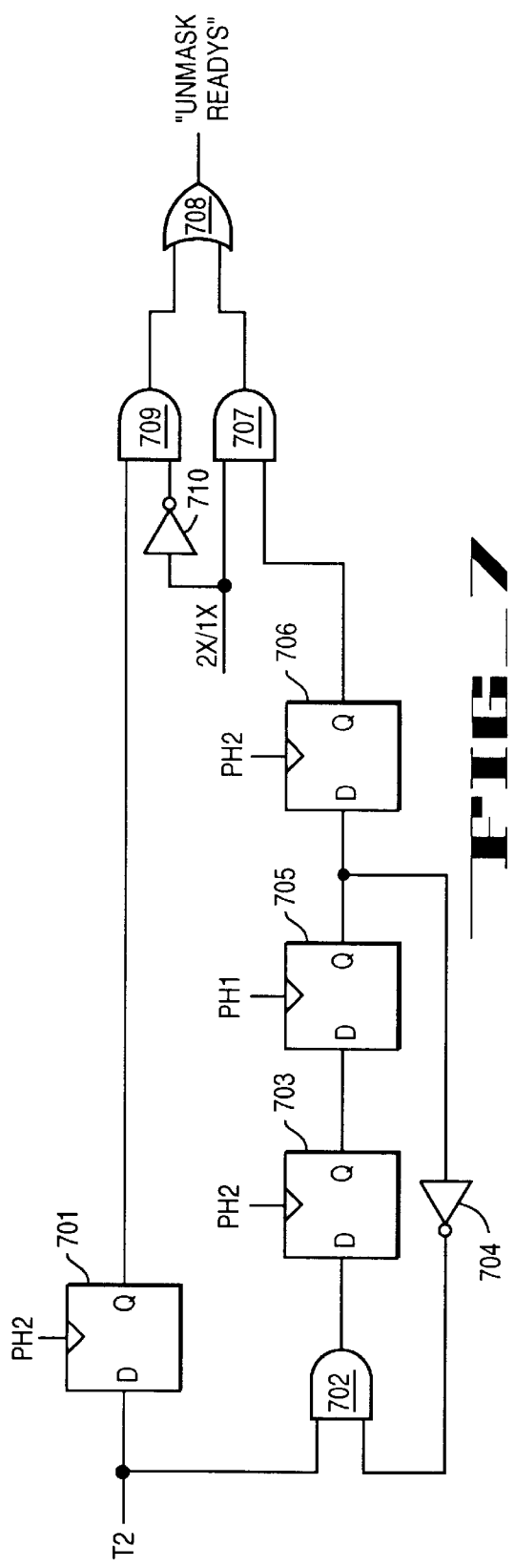
FIG_7
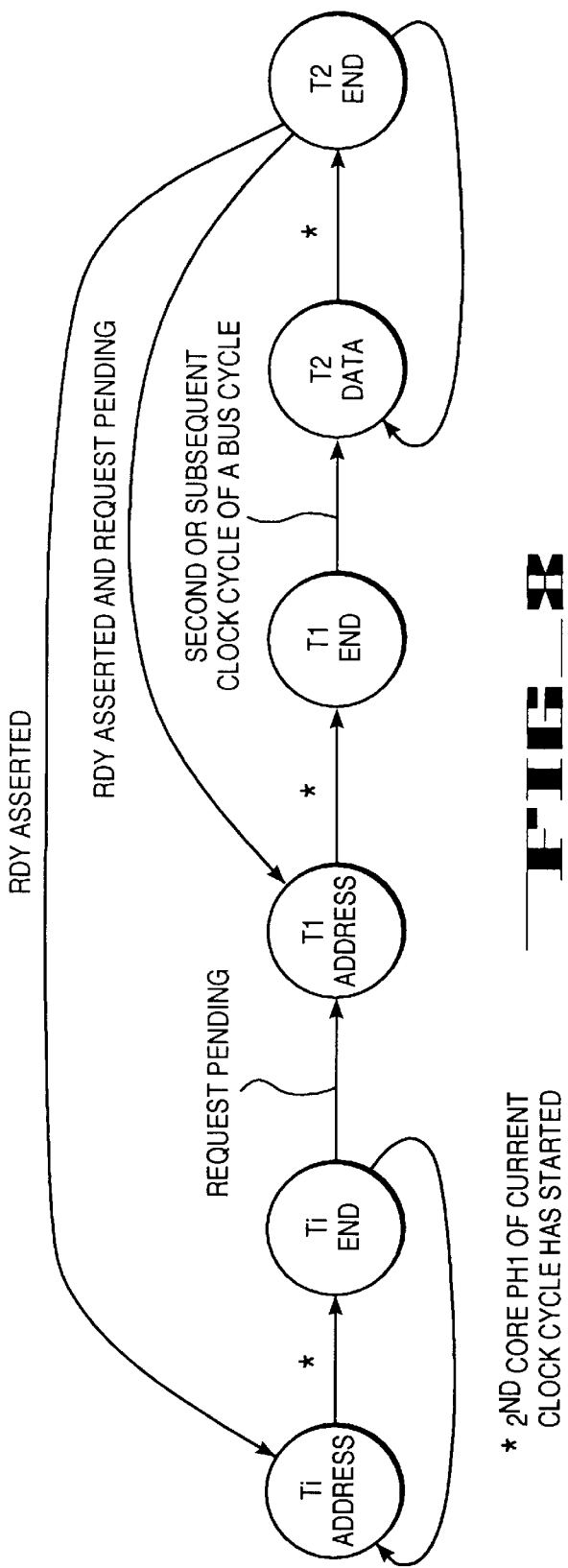
FIG_8

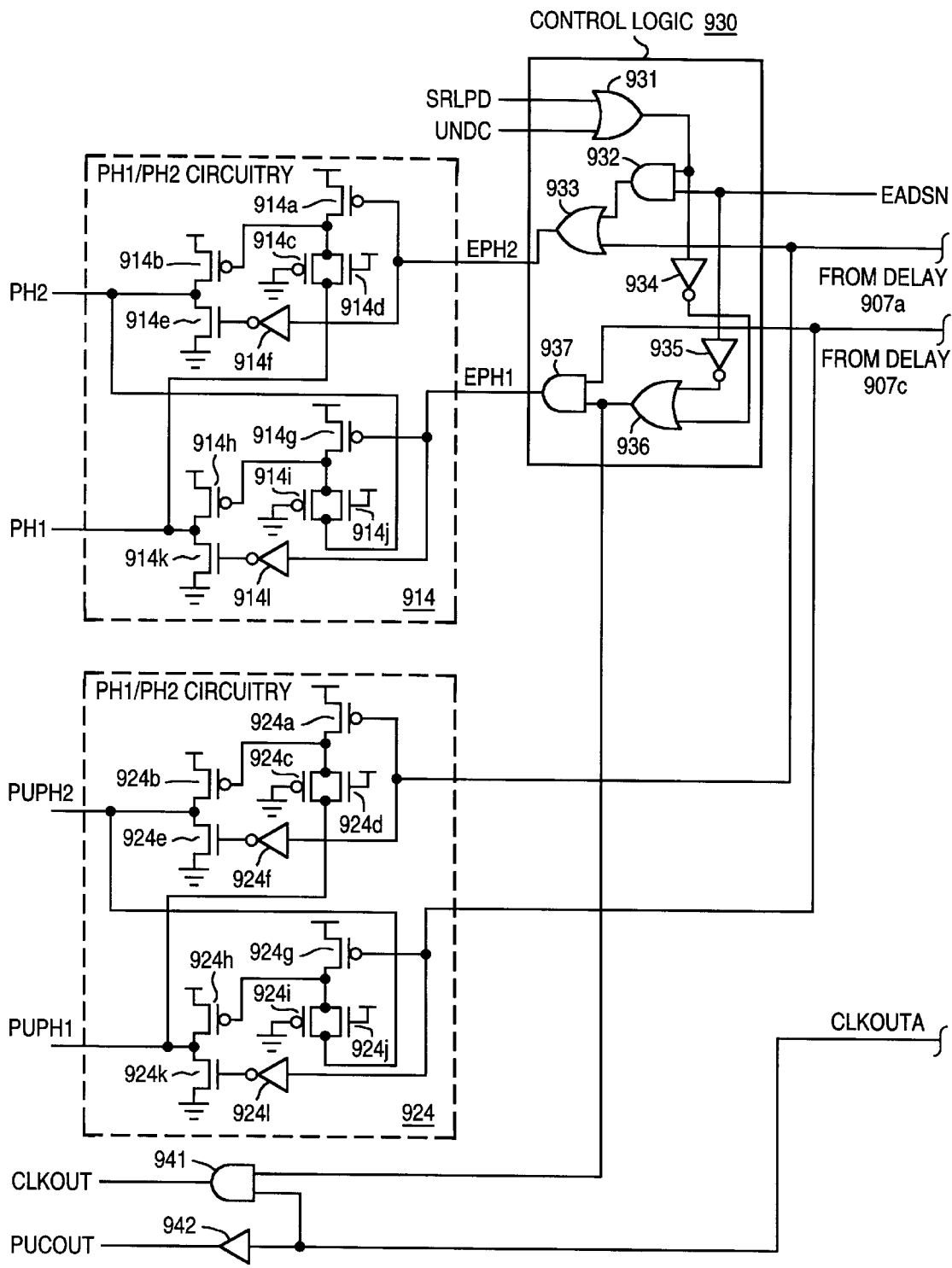
FIG_9A

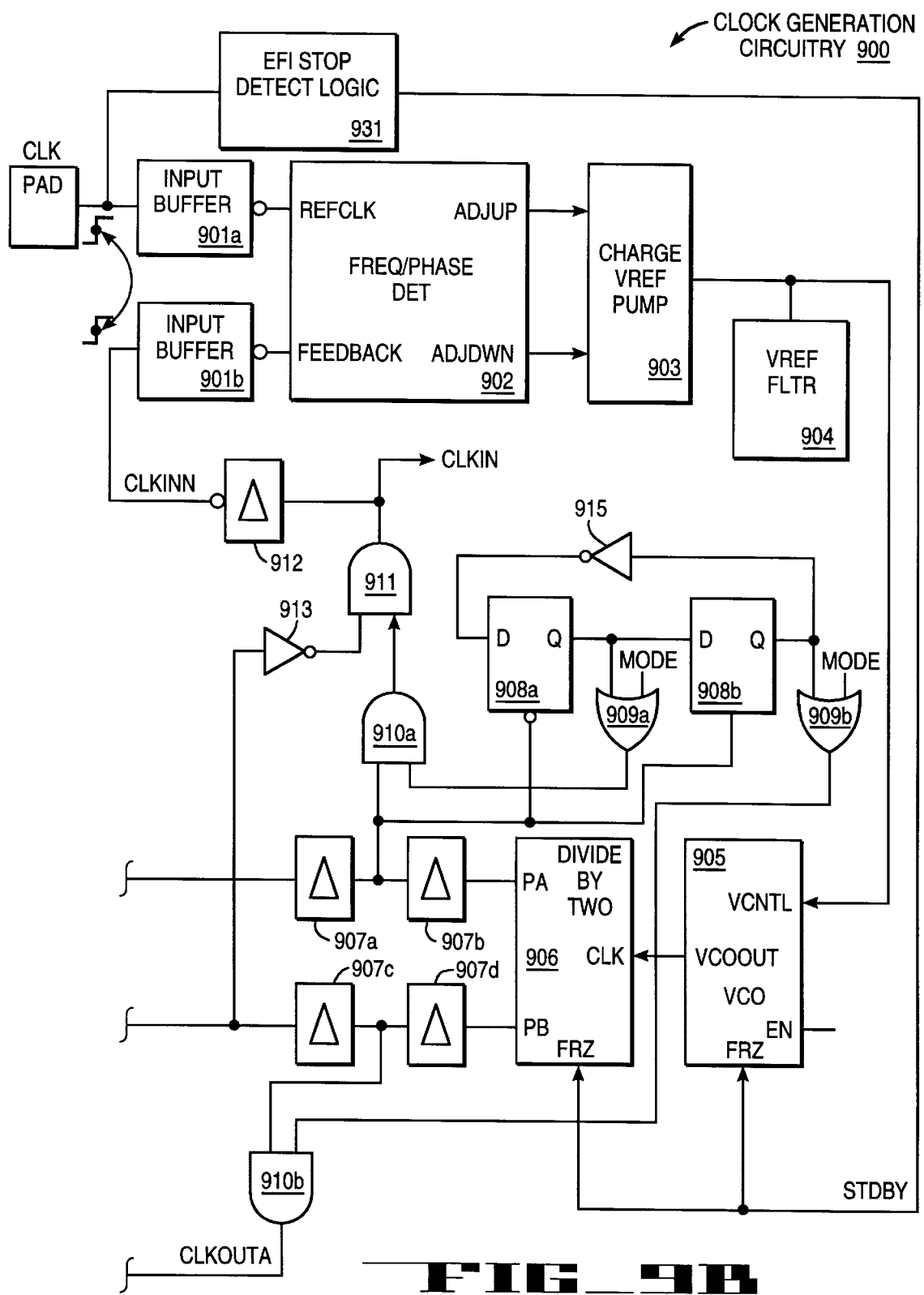
FIG_9B

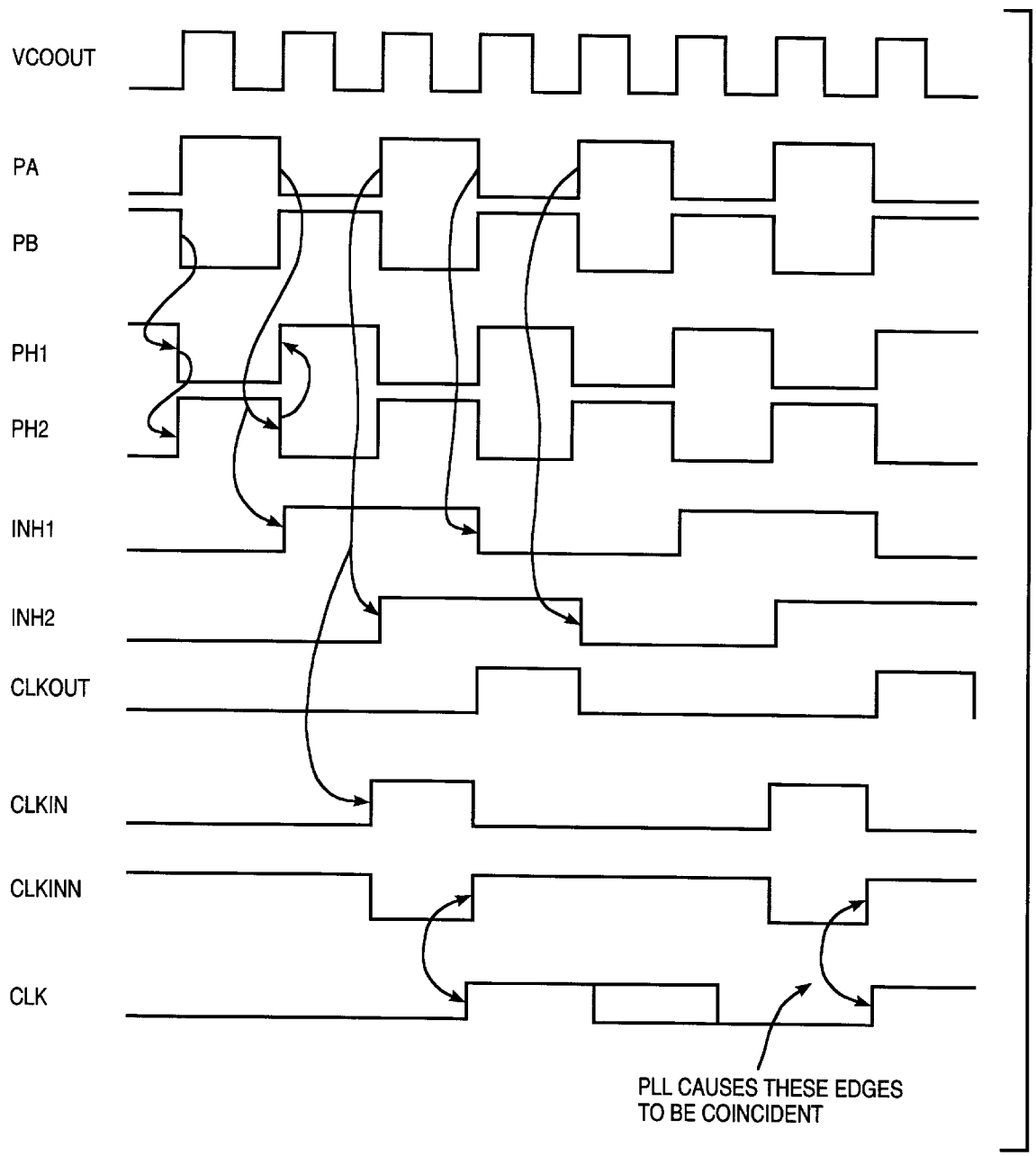
FIG_10

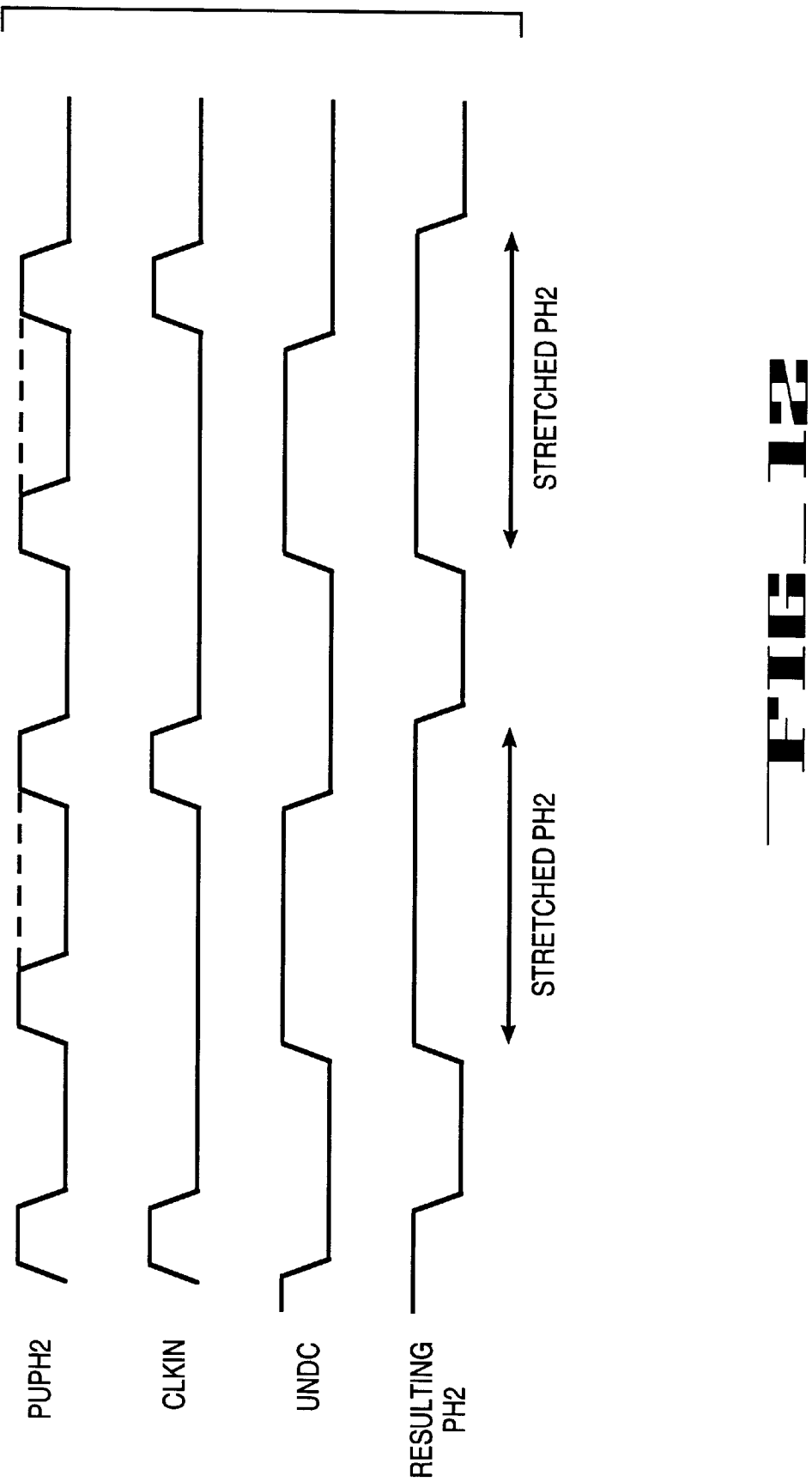
FIG_12

METHOD AND APPARATUS FOR POWERING DOWN AN INTEGRATED CIRCUIT HAVING A CORE THAT OPERATES AT A SPEED GREATER THAN THE BUS FREQUENCY

This is a continuation of application Ser. No. 08/036,627, filed Mar. 24, 1993, now abandoned, which is a continuation-in-part application of application entitled, "Microprocessor Having A Core Which Operates At Twice The Frequency Of The Input Clock Of The Microprocessor", Ser. No. 07/778,575, filed on Oct. 17, 1991, now abandoned.

FIELD OF THE INVENTION

The present invention relates to the field of computers and computer systems. More specifically, the invention relates to features incorporated within a computer system or within a microprocessor for controlling clocking signals.

BACKGROUND OF THE INVENTION

Typically, a computer system contains a processor, a bus, and other peripheral devices. The processor is responsible for executing instructions using the data in the computer system. The bus is used by the microprocessor and the peripheral devices for transferring information between one another. The information on the bus usually includes data, address and control signals. The peripheral devices comprise storage devices, input/output I/O devices, etc. Generally, all operations being performed in the computer system occur at the same frequency.

The microprocessor has a core for processing the data. Since generally all operations performed by the computer system occur at the same frequency, the logic operations performed by the core are at the same frequency as the transfer of data, address and control signals on the computer system bus.

Some logic operations performed by the core, such as arithmetic operations, require multiple cycles to complete. During completion of these multiple cycle operations, the bus remains idle. It is desirable to have the core operate at a faster speed than the bus, so that operations are performed more quickly. In this manner, the bus will be used more frequently, such that bus idle states will be reduced and operations performed more quickly.

Many techniques exist to reduce the power consumed by the processor. One technique for this has been to stop the processor regardless of the current instruction being executed. Methods have been employed whereby the processor is stopped on predetermined conditions. Another mechanism used in the prior art causes the processor to stop asynchronously by disabling the externally generated clock signal utilized to generate the internal clock of the device.

A problem with asynchronously disabling the external reference frequency generator involves the fact that most microprocessors and computer systems utilize a phase-locked loop (PLL) circuit to multiply the reference frequency by some factor to generate the system's internal clock rate. The internal clock signal is utilized by the central processing unit (CPU) of the computer during the execution of its various functions and instructions. A problem arises is that if the clock is stopped externally, then the internal phase-locked loop circuitry is likewise disabled. Under such circumstances, reenabling the external reference frequency does not produce an instantaneous response from the PLL. In other words, the PLL requires some fixed time period (e.g., hundreds of microseconds) to stabilize and achieve lock. During this start-up time period, spurious signals and glitches are commonly generated, leading to unpredictable results. Thus, starting and stopping of the processor's clock by disabling the external reference input frequency results in a loss of pseudoinstantaneous response. What is needed is a means for reducing power consumption in a processor which does not cause a PLL in a computer system to become unstabilized, such that spurious signals and glitches result. That is, it is desirable to have a mechanism for reducing power in a processor which can be utilized such that the remainder of the computer system is unaware of its use (i.e., it is transparent).

When additional features are integrated in a microprocessor, its use most often requires changes to the computer system to accommodate the new features. These changes could take the form of modifications to the circuit board, including adding extra circuitry. Ideally, new features and faster processing should be added without changing, for example, the mother board of a computer system. It is thus advantageous to modify microprocessors by incorporating new features in such a way as to reduce or dispense with changes to the remainder of the computer system. It is also advantageous to keep the number of hardware changes small so that preexisting computer applications can benefit by upgrading their computer systems without having to acquire new system components, thereby avoiding huge expenditures.

The present invention provides a means for powering down the processor when the processor is in an idle state. The present invention provides a means for powering down a processor that is transparent to the computer system, such that the processor is able to enter and exit the reduced power consumption state without the remainder of the computer system knowing.

SUMMARY OF THE INVENTION

A method and apparatus for reducing the power consumption of an integrated circuit when the core logic of the integrated circuit is in the quiescent or idle state is described. The method and apparatus includes a phase locked loop (PLL) circuit for generating an internal clock, wherein the frequency of the internal clock is at a predetermined multiple of the frequency of the global clock signal. The method and apparatus also includes core logic for executing instructions synchronously with the internal clock. The present invention provides a method and means for determining when the core is in the quiescent state. In response to this determination, the present invention provides control logic for powering down the core while the core logic is in the quiescent state.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 3 illustrates the timing signals generated by the clock generator of the currently preferred embodiment of the present invention for the 1X core mode.

FIG. 4 is a bus state diagram for the 1X core mode.

FIG. 5 illustrates the timing signals generated by the clock generator of the currently preferred embodiment of the present invention for the 2X core mode.

FIG. 6 is one embodiment of the circuitry used to generate the "prepare for T2 transition" logic signal.

FIG. 7 is one embodiment of the circuitry used to generate the "unmask readys" signal.

FIG. 8 is a bus state diagram for the 2X core mode.

FIGS. 9A and 9B are a circuit schematic of the clock generator of the currently preferred embodiment of the present invention.

FIG. 10 illustrates the timing signals associated with the phase locked loop of the present invention.

FIG. 12 is a timing diagram depicting the undouble clutch mode.

DETAILED DESCRIPTION OF THE INVENTION

A method and apparatus for powering down an integrated circuit is described. In the following description, numerous specific details are set forth such as specific numbers of signals, gates, frequencies, etc., in order to provide a thorough understanding of the present invention. It will be obvious, however, to one skilled in the art that the present invention may be practiced without these specific details. In other instances, well-known computer operations and components have been shown in block diagram form, rather than in detail, to avoid unnecessarily obscuring the present invention.

Overview of the Computer System of the Present Invention

Figure 1:
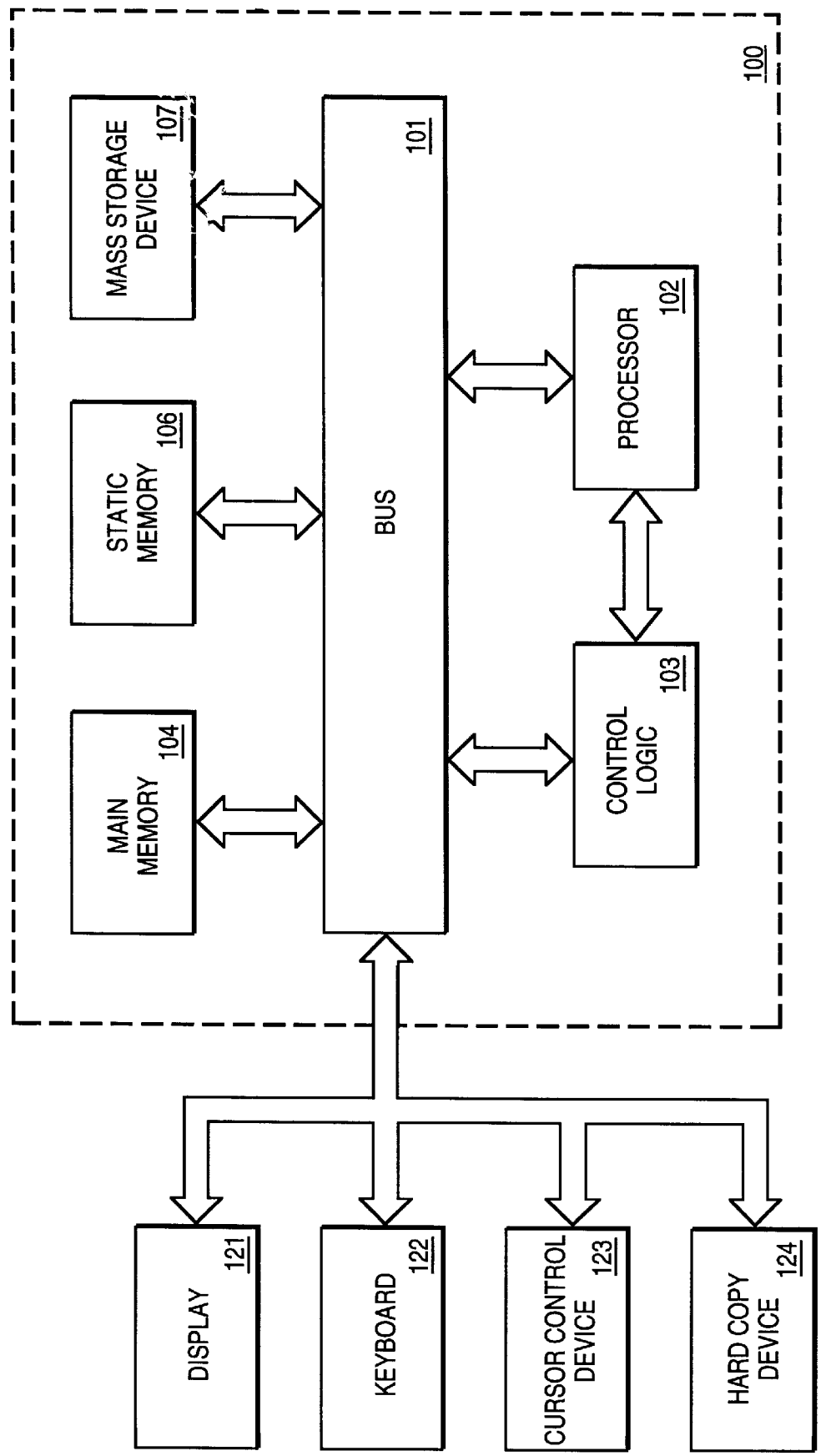
FIG. 1 is a block diagram of the computer system of the present invention.

Referring first to FIG. 1, an overview of a computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

As illustrated in FIG. 1, a computer system, as may be utilized by the preferred embodiment of the present invention, generally comprises a bus or other communications means 101 for communicating information, a processor 102 coupled with bus 101 for processing information, a random access memory (RAM) or other dynamic storage device 104 (commonly referred to as a main memory) coupled with bus 101 for storing information and instructions for processor 102, a read only memory (ROM) or other static storage device 106 coupled with bus 101 for storing static information and instructions for processor 102, a data storage device 107, such as a magnetic disk and disk drive, coupled with bus 101 for storing information and instructions. Note that in the currently preferred embodiment, processor 102 comprises a 80486DX2 brand microprocessor of Intel Corporation of Santa Clara, Calif.

The computer system also includes a display device 121, such as a cathode ray tube, liquid crystal display, etc., coupled to bus 101 for displaying information to the computer user, an alphanumeric input device 122 including alphanumeric and other keys, etc., coupled to bus 101 for communicating information and command selections to processor 102 and a cursor control device 123 coupled to bus 101 for controlling cursor movement. Moreover, the system includes a hard copy device 124, such as a plotter or printer, for providing a visual representation of the computer images. Hard copy device 124 is coupled with processor 102, main memory 104, static memory 106 and mass storage device 107 through bus 101.

The computer system also includes control logic 103 coupled to bus 101 and processor 102 for powering up and powering down processor 102 upon the occurrence of one or more predetermined events. In one embodiment, control logic 103 monitors processor 102 to determine whether processor 102 is idle, wherein control logic 103 powers down processor 102.

Of course, certain implementations and uses of the present invention may not require nor include all of the above components. For example, in certain implementations a keyboard and cursor control device for inputting information to the system may not be required. In other implementations, it may not be required to provide a display device for displaying information.

Overview of the Processor of the Present Invention

Figure 2:
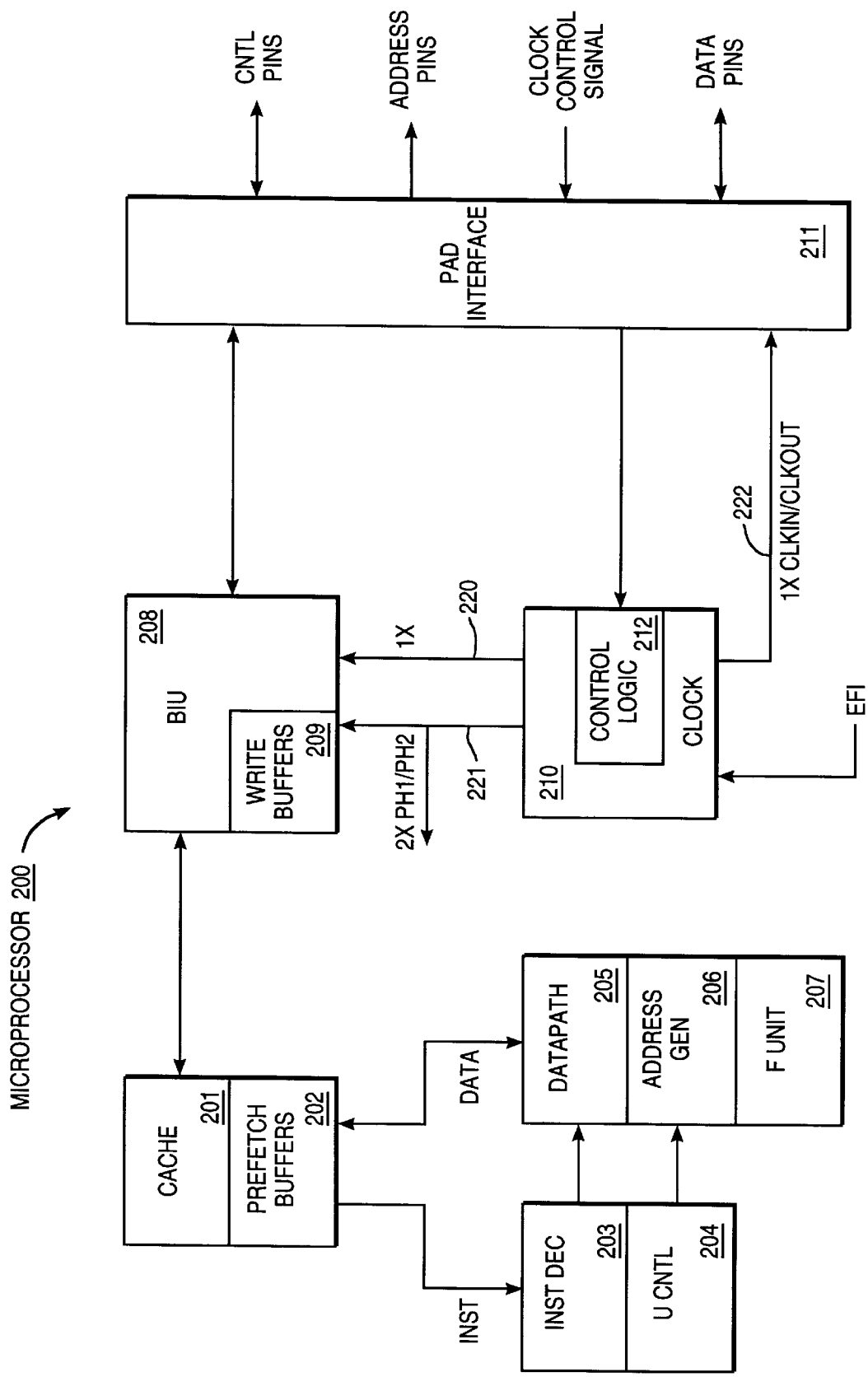
FIG. 2 is a block diagram of the currently preferred embodiment of the microprocessor of the present invention.

FIG. 2 shows a block diagram of the processor, processor 200, utilized by the preferred embodiment of the present invention. Processor 200 is preferably manufactured as an integrated circuit using a metal-oxide-semiconductor (MOS) process. Referring to FIG. 2, processor 200 generally comprises cache 201, prefetch buffers 202, instruction decoder 203, microcode unit 204, datapath 205, address generator 206, floating-point unit 207, bus interface unit (BIU) 208, write buffers 209, clock generator 210 and pad interface 211. All of the units of the processor except the bus controller in BIU 208 constitute the core of processor 200.

Pad interface 211 is coupled to clock generator 210 and BIU 208 and provides a pin interface for control, address and data signals between processor 200 and the remainder of the computer system. BIU 208 includes the bus controller and provides the necessary interface between the internal buses of processor 200, and in particular cache memory 201 and prefetch buffers 202 and the external buses responsible for fetching data from the external data memory system. In the currently preferred embodiment, the present invention uses an external 32-bit address bus and a 32-bit data bus. BIU 208 is also coupled to write buffers 209 which provide a buffer storage area for data which is to be transferred from processor 200 to the remainder of the computer system. In the currently preferred embodiment, write buffers 209 provide buffer storage for data which is transferred off-chip. BIU 208 is coupled to receive clock signals from clock generator 210 on line 220 and line 221. Note that in the currently preferred embodiment, only those portions of BIU 208 that interface with pad interface 211 operate at the same clock frequency, while the remainder operates at twice the frequency.

Cache 201 stores instructions and data for execution by processor 200. Prefetch buffers 202 is coupled to cache 201 and is responsible for prefetching data and instructions from cache 201 or from BIU 208 for use in execution by processor 200.

Instruction decoder 203 decodes the incoming instructions. Instruction decoder 203 is coupled to receive the instructions from prefetch buffers 202 and sends the decoded instructions, in the form of microcode, to datapath 205 for execution. Microcode unit 204 contains a memory (CROM) which stores the microcode instructions (microcode) for the processor. Microcode unit 204 is coupled to instruction decoder 203 and shares control of instruction execution with instruction decoder 203 in a manner well-known in the art. Microcode unit 204 provides address generator 206 with address information which address generator 206 uses to generate addresses corresponding to data necessary in the execution of the decoded instructions. Address generator 206 provides the addresses for either datapath 205 or floating point 207 depending on the instruction type.

Microcode unit 204 is also responsible for instruction boundary processing, such as interrupt/exception arbitration, and the halting of instruction decoder 203 when necessary. Microcode unit 204 is also responsible for handling most of the freeze conditions, such as cache memory miss, etc.

Datapath 205 is the main execution data path for the processor. Datapath 205 contains the arithmetic logic unit, register file, barrel shifter, constant read-only memory (ROM) and flags. Datapath 205 is coupled to prefetch buffers 202 and requests data from cache 201, via prefetch buffers 202. Datapath 205 executes the microcode provided by instruction decoder 203 using the data received from prefetch buffers 202 according to the addresses generated by address generator 206.

Processor 200 also includes floating point unit 207, which is coupled to address generator 206. Floating point unit 207 contains logic to execute the floating point instructions.

Clock generator 210 generates the clock signals for processor 200. In the present invention, clock generator 210 generates the clock signals in response to an external frequency clock input (EFI) signal, which it is coupled to receive. In the currently preferred embodiment, the EFI clock signal has a frequency of 33 MegaHertz (MHz). Clock generator 210 supplies the clock signals to BIU 208 via bus (i.e., I/O) clock signal line 220 and the remainder of units in processor 200 via core clock signal line 221. Clock generator 210 sends clock signals to pad interface 211 via lines 222. Clock generator 210 includes control logic 212 for controlling the operation of clock generator 210. In the present invention, clock control logic 212 includes logic for disabling and enabling some of the clock signals produced by clock generator 210, such that clock generator 210 does not output those clock signals. Clock control logic 212 is also responsible for controlling the frequency of the core clock signals of line 221 in comparison to the frequency of the bus (i.e., I/O) clock signals 220 and the clock signals 222 output to pad interface 211.

The block diagram of FIG. 2 is realized with ordinary circuits. Control signals not required for an understanding of the present invention are not illustrated in FIG. 2. Additionally, functions not required for an understanding of the present invention are not shown in order to facilitate an understanding of the invention. Note also that some lines may comprise multiple conductors.

Clock Signals of the Present Invention

Clock generator 210 of the present invention provides core clock signals and bus clock signals for processor 200. The core clock signals clock the operations performed by the units which constitute the core, including the bus controller. In the currently preferred embodiment, the core clock signals are referred to as phase one (PH1) and phase two (PH2). The present invention also generates clock signals which are referred to as power up phase one (PUPH1) and power up phase two (PUPH2). The PUPH1 and PUPH2 clock signals are the same as the PH1 and PH2 core clock signals and clock the operation of control logic responsible for placing the processor in and out of a reduced power consumption state (i.e., the powered and powered down states), including any synchronizers that are required. The bus clock signals clock the transfer of data occurring on the computer system bus. Data transfers occur in two clock phases. During an out phase, data is driven out onto the bus, while during an in phase, data is driven into processor 200 from the bus. In the currently preferred embodiment, the bus clock signals generated by clock generator 210 corresponding to the out and in phases are the CLKOUT and CLKIN signals respectively (line 222). Note that in the currently preferred embodiment, all external timing parameters are specified with respect to the rising edge of the external clock input (EFI).

In the present invention, clock generator 210 has multiple modes of operation. In one mode, clock generator 210 is capable of providing core clock signals at the same frequency as the bus clock signals. This is referred to herein as the 1X mode. In another mode, clock generator 210 provides core clock signals at a frequency which is a multiple of the bus clock signals. In other words, clock generator 210 of the present invention is capable of providing core signals which are two times (2X), three times (3X), four times (4X), etc. the frequency of the bus clock signals. In the currently preferred embodiment, clock generator 210 of the present invention provides core clock signals at the same frequency as the bus clock signals in one mode (i.e., the 1X mode) and provides core clock signals at two times (2X) the frequency of the bus clock signals in another mode (i.e., the 2X mode).

In the currently preferred embodiment, in the 1X mode, the core clock signals and the bus clock signals are at the frequency of the EFl, which is 33 MHz. Thus, the bus clock signal, CLKOUT and CLKIN, are the same as the core clock signals, PH1 and PH2 and the PUPH1 and PUPH2 clock signals (with the exception of a small delay). In the currently preferred embodiment, in the 2X mode, the core clock signals are at 66 MHz and the bus clock signals are at 33 MHz. To reiterate, the core clock signals control the operation of the core of processor 200 including the bus controller in BIU 208. Thus, in the currently preferred embodiment, during the 2X mode, all portions of the core are operating at 2X the input clock frequency (i.e., EFl) including the bus controller. Only a small portion of BIU 208 has an indication that the bus is operating at the same frequency of the EFl (e.g., 33 MHz).

The mode of clock generator 210 is determined according to a clock control signal. In the currently preferred embodiment, the clock control signal indicates whether clock generator 210 operates in the 1X or 2X mode. In the currently preferred embodiment, the 1X/2X clock control signal is derived from a bond option. This selectability allows a single die to fulfill the requirements of a number of processor types using wire bond programming of the clock control signal bond pad. In the currently preferred embodiment, by wiring the bond pad, clock generator 2 can be set to operate only in either the 1X mode or can be set to operate in the 2X mode. Note that the clock control signal could be derived by other means.

In order for a processor to be able to operate at both 1X and 2X modes of operation, the bus input and output clock implementation has a particular timing relationship, which allow for a straightforward 1X bus frequency to 2X core frequency interface. To reiterate, in 2X mode, the core and the bus controller operate at twice the input clock frequency.

It should be noted that in the present invention, the bus controller operates at 2X the input clock frequency to allow the write buffers to be loaded at a rate of up to one load per core clock. Therefore, the write buffers are loaded whether or not the bus is ready and each write is completed as the bus becomes available. In this manner, the core is able to continue operating without having to wait for the slower bus. Also in the currently preferred embodiment of the present invention, in order to make the 1X bus to 2X core interface straightforward, the architecture of processor 200 is designed in a such a manner as to provide a very contained 1X/2X boundary. The boundary between the 1X bus and 2X core is contained by interfacing BIU 208 with cache 201 only.

With respect to the clock signals, in the 2X mode of the present invention, the core PH1 and PH2 signals (and the PUPH1 and PUPH2 clock signals) have a timing relationship with respect to the CLKIN and CLKOUT bus clock signals, such that the I/O buffers can communicate properly with the core of the processor. In the 2X mode of the currently preferred embodiment, the CLKOUT and CLKIN signals are quarter duty cycle and are offset with respect to each other. That is, during the 2X mode, bus clock signals, CLKOUT and CLKIN, are quarter duty cycle clock signals that are synchronized with every other core clock signal PH1 and PH2 respectively. In the currently preferred embodiment, since the original phase high time of the 2X mode core phases, PH1 and PH2, are utilized by the 1X mode bus clock signals, CLKOUT and CLKIN, and the phases of the bus clock signals are aligned with the beginning and ending of the 2X core clock signals, the circuitry required to drive the half speed bus is reduced.

Note that quarter duty cycles are distinguished from half duty cycles in which the high and low times for the signal are equal. In quarter duty cycle signals, the high and low times for the signal are not even, such that the high or low time is only one quarter the total time for a high/low transition. Note that in the present invention, the pulse width of the core clock signal is the same as the pulse width of the bus clock signals regardless of whether the core clock signals are 1X, 2X, 3X, 4X, etc., the frequency of the bus clock signals.

The Clock Signals of the Present Invention

The timing signals generated by the currently preferred embodiment of clock generator 210 during 1X mode are shown in FIG. 3. Referring to FIG. 3, the input clock signal CLK (i.e., EFl) is shown. PH1 and PH2 are the 1X core clock signals. Note that the PUPH1 and PUPH2 clock signals are not shown but are the same as the PH1 and PH2 core clock signals. The CLKOUT and CLKIN signals are the bus clock signals that are synchronized with every other PH1 and PH2 core clock signal respectively.

FIG. 3 also shows the BUS STATE for the computer system of the present invention during 1X mode. The bus cycle starts at T1 when the addresses are driven out onto the computer system bus when the CLKOUT signals transition high. The bus controller then uses logic to set up a transition from T1 to T2 during the PH2 core clock signals of T1. At the start of T2, data is driven onto the computer system bus when the CLKOUT signal transitions high if the cycle is a write cycle; otherwise, nothing occurs during the CLKOUT high state. During T2, data is returned from the computer system bus during the CLKIN phase. The data is used if a ready signal indicates that the data is good. At this state, the bus controller can transition to either new T2, a new T1 or an idle state depending on the cycle type. FIG. 4 illustrates the bus state diagram for the 1X core mode. Referring to FIG. 4, state T1 corresponds to the idle state, such that while the processor is idle or enters the idle state the bus state transitions to state T1. The bus state machine transitions to state T1 when a request is pending. This occurs at the first clock cycle of a bus cycle. As stated above, in the T1 state, addresses are driven out onto the computer system bus when CLKOUT goes high. From the T1 state, the state machine transitions to the T2 state at the second or subsequent clock cycle of a bus cycle. Once in the T2 state, if the cycle is a write cycle, then the data is driven onto the computer system bus when CLKOUT transitions. If the cycle is a read cycle, data is returned from the system bus during CLKIN. Also, during the T2 state, the ready signal is sampled. If the ready signal is asserted and no request for the bus is pending, then the state machine transitions to the T1 state. If the ready signal is asserted and a bus request is pending, then the state machine transitions to the T1 state.

The timing signals generated by the currently preferred embodiment of clock generator 210 during 2X mode are shown in FIG. 5. Referring to FIG. 5, the input clock signal CLK (i.e., EFl) is shown. The PH1 and PH2 are the core clock signals. Note that the PUPH1 and PUPH2 clock signals are not shown but are the same as the PH1 and PH2 core clock signals. The CLKOUT and CLKIN signals are quarter duty cycle bus clock signals. Note that the CLKOUT and CLKIN signals are synchronized with every other PH1 and PH2 core clock signal respectively.

FIG. 5 also shows the BUS STATE for the computer system of the present invention. The bus cycle starts at T1 ADDRESS when the addresses are driven out onto the computer system bus when the CLKOUT signals transition high. It should be noted that T1 is split into two states, T1 ADDRESS and T1 END. This effectively adds a wait cycle to T1. The present invention includes logic to prevent the bus controller from realizing that it is in T1 during the T1 ADDRESS time. At T1 END, the bus controller determines that it is in Ti. For this case, when the core is operating at twice the speed of the bus, if the bus controller were not modified, it would attempt to transition from T1 ADDRESS to T2 instead of T1 END. The bus controller now sets up a transition from T1 to T2 during the PH2 core clock signals of T1 END. At the start of T2 DATA, data is driven onto the computer system bus when the CLKOUT signal transitions high if the cycle is a write cycle; otherwise, nothing occurs during the CLKOUT high state. During T2 END, data is returned from the computer system bus during the CLKIN phase. The data is used if a ready signal indicates that the data is good. At this state, the bus controller can transition to either new T2, a new T1 or an idle state depending on the cycle type.

The bus controller of the present invention is modified with the addition of a holdoff signal which holds off the initiation of the transition from the T1 state to the T2 state until the end of T1 END. In the present invention, the hold off is accomplished with the addition of "prepare for T2 transition" logic signal, which is shown in FIG. 5. The timing of the external ready signals is critical to the operation of the state machines of the bus controller. Furthermore, in the present invention, circuitry masks ready inputs until the "unmask readys" period occurs as shown in FIG. 5. The additional logic required to accomplish the hold off is very minimal. Using the hold off circuitry allows the present invention to interface processor 200 with the computer system bus in 2X mode without having to include additional output drivers and input latches.

FIG. 6 illustrates one embodiment of the "prepare for T2 transition" holdoff logic. Referring to FIG. 6, logic 600 comprises D flip-flops 604–607, AND gates 601, 603 and 608, inverter 602 and OR gate 609. One input to AND gate 601 is the 2X/1X core mode indication signal. The other input is the new bus cycle signal which indicates when a new bus cycle occurs. The output of AND gate 601 is coupled to the D input of flip-flop 605. The enable input (E) of flip-flop 605 is also coupled to the CLKOUT bus clock signal. Flip-flop 605 is clocked by the PH1 core clock signal. The Q output of flip-flop 605 is coupled to the D input of flip-flop 606, which is clocked by the PH2 core clock signal. The Q output of flip-flop 606 is coupled to the D input of flip-flop 607, which is clocked by the PH1 core clock signal. The Q output of flip-flop 607 is coupled to one of the inputs of AND gate 608. The other input to AND gate 608 is coupled to the output of flip-flop 605. The output of AND gate 608 is coupled to one of the inputs of OR gate 609. The other input to OR gate 609 is coupled to the 0 output of flip-flop 604, which is clocked by the PH1 core clock signal. The D input of flip-flop 604 is coupled to the output of AND gate 603. One input to AND gate 603 is coupled to new bus cycle indication signal. The other input to AND gate 603 is coupled to the output of inverter 602. The input of inverter 602 is coupled to the 2X/1X mode indication signal. The output of OR gate 609 is the "prepare for T2 transition" logic signal.

The 2X/1X signal controls the outputs of AND gates 601 and 603. When the 2X/1X signal is low, indicating that the processor is in 1X mode, the output of AND gate 603 is enabled, via inverter 602, and the output of AND gate 601 is disabled. When the 2X/1X signal is high, indicating that the processor is in 2X mode, the output of AND gate 601 is enabled and the output of AND gate 603, via inverter 602 is disabled. Thus, AND gates 601 and 608 in conjunction with flip-flops 605–607 comprises the 2X path for logic 600, while AND gate 603, inverter 602 and flip-flop 604 form the 1X path.

If the 2X/1X signal indicates that the processor is operating in 1X mode, the output of AND gate 603 will be high when a new bus cycle occurs (as indicated by the new bus cycle input to AND gate 603). The new bus cycle signal is a function of the PH2 core clock signal. Thus, when the new bus cycle occurs, the D input to flip-flop 603 is high. When the D input to flip-flop 603 is high, the Q output of flip-flop 603 goes high after the next assertion of the PH1 core clock signal. The Q output of flip-flop 603 represents the T1 state during the 1X mode of operation. The Q output always being high causes the output of OR gate 609 to be high. Thus, in the 1X mode, the "prepare for T2 transition" signal is always high.

If the 2X/1X signal indicates that the processor is operating in 2X mode, then the output of AND gate 601 is high. The output of AND gate 601 is received into the D input of flip-flop 605 and causes the Q output (at node A) to change state when the CLKOUT and PH1 signals are asserted. The output of flip-flop 605 propagates through flip-flops 606 and 607 on successive assertion of the PH2 and PH1 clock signals respectively. Until the Q output of flip-flop 607 (at node C) goes high, the output of AND gate 608 will be low. Thus, when the Q output of flip-flop 605 propagates through flip-flops 606 and 607, then the output of AND gate 608 will go high. The output of AND gate 608 being high represents the T1 END bus state. The high output of AND gate 608 also causes the output of OR gate 609 to go high, such that the "prepare for T2 transition" logic signal is high.

FIG. 7 illustrates one embodiment of the "unmask readys" holdoff logic. Referring to FIG. 7, logic 700 comprises D flip-flops 701, 703, 705 and 706, AND gates 702, 707 and 709, inverters 704 and 710 and OR gate 708. The T2 state signal is coupled to one input of AND gate 702. The other input to AND gate 702 is coupled to the output of inverter 704. The output of AND gate 702 is coupled to the D input of flip-flop 703, which is clocked by the PH2 core clock signal. The Q output of flip-flop 703 is coupled to the D input of flip-flop 705, which is clocked by the PH1 core clock signal. The Q output of flip-flop 705 is coupled to the input of inverter 704 and the D input of flip-flop 706, which is clocked by the PH2 core clock signal. The Q output of flip-flop 706 is coupled to one input of AND gate 707. The other input to AND gate 707 is coupled to the 2X/1X mode indication signal. The output of AND gate 707 is coupled to one input of OR gate 708. The other input to OR gate 708 is coupled to the output of AND gate 709. The inputs to AND gate 709 are coupled to the output of inverter 710 and the Q output of flip-flop 701, which is clocked by the PH2 core clock signal. The input of inverter 710 is coupled to the 2X/1X mode indication signal. The input of flip-flop 701 is coupled to the T2 state signal. The output of OR gate 708 is the "unmask readys" signal.

The "unmask readys" logic 700 generates the "unmask readys" signal. The 2X/1X mode selection signal controls which source input drives the output of OR gate 708, which is the "unmask readys" logic signal. If the 2X/1X mode selection signal indicates that the processes is in 1X mode, the output of AND gate 707 will be disabled and the output of AND gate 709 will be enabled, via inverter 710. If the 2X/1X mode selection signal indicates that the processor is operating in 2X mode, then the output of AND gate 707 will be enabled and the output of AND gate 709 will be disabled, via inverter 710. Thus, the 2X/1X mode selection signal indicates whether the output of OR gate 708 will be derived from flip-flop 701 or from the combination of AND gate 702, inverter 704 and flip-flops 703, 705 and 706.

If the 2X/1X signal is low, indicating that the processor is in 1X mode, then the "unmask readys" signal will be high whenever the Q output of flip-flop 701 is high. When the bus state machine transitions into the T2 state, the T2 signal is asserted. Note that the T2 signal is a function of the PH1 core clock signal. When the next PH2 core clock signal is asserted, the high T2 input causes the Q output of flip-flop 701 to go high, such that while the bus state machine is in state T2 the output of OR gate 709 is high. Thus, the "unmask readys" signal is high.

If the 2X/1X signal is high, indicating that the processor is in 2X mode, then the "unmask readys" signal will be high whenever the Q output of flip-flop 706 is high. The output of flip-flop 706 is high when its D input is high and the PH2 core clock signal is asserted. The D input of flip-flop 706 will be high when the output of AND gate 702 is high and a PH2 and PH1 clock pulses are asserted in succession by flip-flops 703 and 705. The output of AND gate 702 is high when the T2 signal is high and when the output of inverter 704 is high. Before the bus state machine transitions into the T2 state, the output of flip-flop 705 is low, such that the output of inverter 704 is high. Thus, when the bus state machine transitions into the T2 state and the T2 signal goes high, the output of AND gate 702 goes high. Then after the assertion of the PH2, PH1 and PH2 core clock signals in succession, the high output from AND gate 702 propagates through flip-flops 703, 705 and 706 respectively, thereby causing the output of OR gate 708 to go high. In this manner, the "unmask readys" signal is asserted.

Note, however, that once the signal propagates through flip-flop 705, the output of inverter 704 goes low, thereby causing the output of AND gate 702 to go low. When this occurs, the "unmask readys" signal will go low after successive PH2, PH1 and PH2 core clock pulses. The feedback from the output of flip-flop 705 to the input of AND gate 702, via inverter 704, is required when multiple back to back T2 states occur, such as during burst cycles.

In the currently preferred embodiment, the holdoff signal is generated by a holdoff generator in the bus controller. In the currently preferred embodiment, the holdoff signal asserts when CLKOUT is asserted and remains asserted for two core clock phases. This prevents the bus controller from transitioning prematurely. FIG. 8 illustrates a bus state diagram for the 2X mode. Referring to FIG. 8, Ti ADDRESS and T1 END represents the idle state when the bus is idle. The bus state machine transitions from the Ti ADDRESS state to the Ti END state when the second core PH1 clock signal of the current cycle has started. The bus state machine transitions from the Ti END state to the T1 ADDRESS state at the start of the first clock cycle of a bus cycle when a request for the bus is pending. During the T1 ADDRESS state, the addresses are driven out from the processor when the CLKOUT bus clock signal goes high. The bus state machine transitions to the T1 END state when the second core PH1 clock signal of the current clock cycle has started. During the T1 END state, the bus controller sets up for a transition into state T2. The bus state machine transitions between the T1 END state and the T2 DATA state at the start of the second or subsequent clock cycles of a bus cycle. In the T2 DATA state, if the bus cycle is a write cycle, then the data is driven onto the computer system bus when the CLKOUT bus clock signal transitions. The bus state machine transitions from the T2 DATA state to the T2 END state when the second core PH1 clock of the current clock cycle has started. During the T2 END state, if the bus cycle is a read cycle, the data is returned from the system bus during the CLKIN bus clock. Also, during the T2 END state, the ready signals are unmasked and sampled. If a ready signal is asserted and no bus request is pending, then the state machine transitions from the T2 END state to the T1 Address state. If a ready signal is asserted and a request is pending, then the bus state machine transitions from the T2 END state to the T1 ADDRESS state.

In the currently preferred embodiment, the holdoff generator is activated using the 1X/2X signal. In the currently preferred embodiment, an AND gate enables and disables the holdoff generator using the 1X/2X selection signal, wherein the AND gate outputs a logical zero when processor 200 is in 1X mode, which disables the holdoff signal.

Overview of the Clock Generator of the Present Invention

In the currently preferred embodiment of the present invention, the clock generator includes a phase locked loop (PLL), as shown in FIGS. 9A and 9B. The PLL generates both the PH1 and PH2 core clock signals, the PUPH1 and PUPH2 clock signals, the CLKOUT and CLKIN bus clock signals and the PUCOUT clock signal. In the currently preferred embodiment, the PLL is a 4X phase locked loop which is capable of generating the PH1 and PH2 core clock signals (as well as the PUPH1 and PUPH2 clock signals) at one time or two times the frequency of the bus clock signals (and the external clock input signal). Although the PLL in the currently preferred embodiment is capable of generating core clock signals at twice the frequency of the frequencies of the bus clock signals, the core clock signals of the present invention could be provided at frequencies which are multiples (2X, 3X, 4X, etc.) of the bus clock signals.

Referring to FIGS. 9A and 9B, clock generator circuitry 900 comprises input buffers 901A and B, frequency phase detector 902, charge pump 903, loop filter 904, voltage-controlled oscillator (VCO) 905, a divide-by-two circuit 906, delays 907A–D and 912, D flip-flops 908A and 908B, inverters 913, 915 and 942, OR gates 909A and 909B, AND gates 910A, 910B, 911 and 941, PH2/PH1 circuitry 914, PH2/PH1 circuitry 924, control logic 930, and EF1 stop detect circuit 931.

Input buffers 901A and B buffer the signals on their inputs and output the signals in inverted form. The purpose of the buffers is to align the positive edges of their input signals so that frequency phase detector 902 can determine the phase difference between the two signals. Phase detector 902 only examines the buffered negative edges of the signals. The input of input buffer 901A is coupled to the input clock, CLK. In the currently preferred embodiment, CLK is a 33 MHz input to the processor from an external clock source. The output of buffer 901A is coupled to the REFCLK input of frequency phase detector 902. The input to input buffer 901B is coupled to delay 912. The input represents the feedback signal for the PLL in clock generator 900. The output of buffer 901B is coupled to the Feedback input of frequency phase detector 902.

Phase detector 902 compares the input frequencies from input buffers 901A and B and generates an output that is the measure of the phase difference between the signals. Phase detector 902 has two outputs. The ADJUP output is coupled to one of the inputs of charge pump 903. The ADJDWN output is coupled to the other input of charge pump 903. The ADJUP and ADJDWN outputs are generated when the edges of the feedback signal CLKINN lags or leads the edges of the CLK signal respectively.

Charge pump 903 is coupled to loop filter 904 and the VCNTL input of VCO 905. Charge pump 903 generates a charging or discharging current and supplies it to the capacitive elements of loop filter 904 in response to the ADJUP or ADJDWN pulses from phase detector 902 respectively. This current charges or discharges the capacitive elements in loop filter 904, generating a control voltage. The control voltage indicates the extent of difference between the input frequency of CLK signal and the feedback signal CLKINN. The control voltage is coupled to the VCNTL input of VCO 905.

VCO 905 receives the control voltage and an enable signal EN and produces VCOOUT. The VCOOUT output of VCO 905 is coupled to the CLK input of divide-by-two 906. VCO 905 is enabled when the computer system is powered up. When enabled, VCO 905 generates a frequency VCOOUT in response to the control voltage. If the frequency of the CLK signal does not equal the frequency of the feedback signal CLKINN, the frequency generated by VCO 905 deviates in the direction of the frequency of the CLK signal.

Divide-by-two 906 produces two outputs, PA and PB. These outputs are half the frequency of the output VCOOUT of VCO 905 and are non-overlapping pulses. The outputs PA and PB are coupled to delays 907B and 907D respectively. In the currently preferred embodiment, delays 907B and 907D comprise inverters. The output of delay 907B is coupled to delay 907A, one of the inputs to AND gate 910A, and the clock inputs to D flip-flops 908A and B. The output of delay 907D is coupled to the input of delay 907C and one of the inputs of AND gate 910B. In the currently preferred embodiment, delays 907A–D comprise inverters.

D flip-flop 908A generates a Q output in response to being clocked by the PA output signal of divide-by-two 906 that is buffered through delay 907B. The Q output of D flip-flop 908A is coupled to one input of OR gate 909A. The other input of OR gate 909A is coupled to the MODE signal. The 0 output of D flip-flop 908B is coupled to the input of inverter 915. The output of inverter 915 is coupled to the D input of D flip-flop 908A. The Q output of D flip-flop 908A is also coupled to D input of D flip-flop 908B.

The Q output of D flip-flop 908B is also coupled to one of the inputs to OR gate 909B. The other input to OR gate 909B is coupled to the MODE signal. The outputs of OR gate 909A and 909B are coupled to inputs of AND gates 910A and 910B respectively. The output of AND gate 910B is the CLKOUTA signal. The output of AND gate 910A is coupled to one of the inputs of AND gate 911. The other input of AND gate 911 is coupled to the output of inverter 913. The output of AND gate 911 is the CLKIN signal. The output of AND gate 911 is also coupled to the input of delay 912. In the currently preferred embodiment, delay 912 comprises a series of inverters. The output of delay 912 is inverted and coupled to the input of buffer 901B.

The outputs of delays 907A and 907C are coupled to two inputs of control circuitry 930. The output of delay 907A is coupled to one input of OR gate 933. The other input of OR gate 933 is coupled to the output of AND gate 932. The inputs of AND gate 932 are coupled to the EADSN signal and the output of OR gate 931. The inputs of OR gate 931 are coupled to the SRLPD signal and the UNDC signal. The output of OR gate 933 is the EPH2 signal output from control circuitry 930 for input to PH1/PH2 circuitry 914. The output of delay 907C is coupled to one input of AND gate 937. The other input of AND gate 937 is coupled to the output of OR gate 936. The inputs of OR gate 936 are coupled to the outputs of inverters 934 and 935. The input of inverter 934 is coupled to the output of OR gate 931. The input of inverter 935 is coupled to the EADSN signal. The output of AND gate 937 is the EPH1 output of control circuitry 930 for input to PH1/PH2 circuitry 914.

PH1/PH2 circuitry 914 receives the EPH2 and EPH1 as inputs and produces the core clock phase signal, PH2, and the core clock phase signal, PH1. Referring to FIGS. 9A and 9B, the EPH2 input is coupled to the input of inverter 914F and the gate of p-channel transistor 914A. The source of transistor 914A is coupled to Vcc. The drain of transistor 914A is coupled to the gate of p-channel transistor 914B, the drain of transistor 914D and the source of transistor 914C. The gate of transistor 914D is coupled to Vcc, and the source is coupled to the PH1 output. The gate of transistor 914C is coupled to ground and its drain is coupled to the PH1 output. The source of transistor 914B is coupled to Vcc and its drain is coupled to the PH2 output and the drain of n-channel transistor 914E. The gate of transistor 914E is coupled to the output of inverter 914F. The source of transistor 914E is coupled to ground. The EPH1 input is coupled to the input of inverter 914I and the gate of p-channel transistor 914G. The source of transistor 914G is coupled to Vcc. The drain of transistor 914G is coupled to the gate of p-channel transistor 914H, the drain of transistor 914J and the source of transistor 914I. The gate of transistor 914J is coupled to Vcc, and the source is coupled to the PH2 output. The gate of transistor 914I is coupled to ground and its drain is coupled to the PH2 output. The source of transistor 914H is coupled to Vcc and its drain is coupled to the PH1 output and the drain of n-channel transistor 914K. The gate of transistor 914K is coupled to the output of inverter 914I. The source of transistor 914K is coupled to ground. The purpose of circuitry 914 is to ensure that the PH2 and PH1 signals do not overlap. Functionally, circuitry 914 allows one signal to go low before the other goes high. The operation of this implementation is well-known in the art.

The outputs of delays 907A and 907C are also coupled to two inputs of PH1/PH2 circuitry 924. With respect to PH1/PH2 circuitry 924, delay 907A is coupled to the gate of p-channel transistor 924A and the input of inverter 924F. The output of delay 907C is coupled to the gate of p-channel transistor 924G and the input of inverter 924I of PH1/PH2 circuitry 924. PH1/PH2 circuitry 924 produces the clock phase 2 signal, PUPH2, and the clock phase 1 signal, PUPH1. The output from delay 907A is coupled to the input of inverter 924F and the gate of p-channel transistor 924A. The source of transistor 924A is coupled to Vcc. The drain of transistor 924A is coupled to the gate of p-channel transistor 924B, the drain of transistor 924D and the source of transistor 924C. The gate of transistor 924D is coupled to Vcc, and the source is coupled to the PUPH1 output. The gate of transistor 924C is coupled to ground and its drain is coupled to the PUPH1 output. The source of transistor 924B is coupled to Vcc and its drain is coupled to the PUPH2 output and the drain of n-channel transistor 924E. The gate of transistor 924E is coupled to the output of inverter 924F. The source of transistor 924E is coupled to ground. The output of delay 907C is coupled to the input of inverter 924I and the gate of p-channel transistor 924G. The source of transistor 924G is coupled to Vcc. The drain of transistor 924G is coupled to the gate of p-channel transistor 924H, the drain of transistor 924J and the source of transistor 924I. The gate of transistor 924J is coupled to Vcc, and the source is coupled to the PUPH2 output. The gate of transistor 924I is coupled to ground and its drain is coupled to the PUPH2 output. The source of transistor 924H is coupled to Vcc and its drain is coupled to the PUPH1 output and the drain of n-channel transistor 924K. The gate of transistor 924K is coupled to the output of inverter 924I. The source of transistor 914K is coupled to ground. The purpose of circuitry 924 is to ensure that the PUPH2 and PUPH1 signals do not overlap. Functionally, circuitry 924 allows one signal to go low before the other goes high. The operation of this implementation is well-known in the art.

The CLKOUTA output of AND gate 910B is coupled to the inputs of inverter 942 and one input of AND gate 941. The other input of AND gate 941 is coupled to the output of OR gate 936. The output of AND gate 941 is the CLKOUT clock signal. The output of inverter 942 is the PUCOUT clock signal. Note that the PUCOUT signal is used to clock the output of a HOLD Acknowledge signal (not shown) which is used to acknowledge that the processor recognizes the hold state that has been placed on the computer system bus. In the currently preferred embodiment, the hold state of the bus is indicated to the processor of the present invention by a HOLD signal. The use and operation of HOLD signal and hold acknowledge (HOLDA) signals is well-known in the art.

The EF1 stop detect circuit 931 is coupled to the CLK input of the phase locked loop. The output of EF1 stop detect circuit 931 is coupled to VCO 905 and divide-by-two 906.

Operation of the Clock Generation Circuitry of the Present Invention

In the present, clock generation circuitry 900 produces core clock signals, PH2 and PH1, and bus clock signals, CLKIN and CLKOUT, in response to an input CLK signal (i.e., EF1). The CLK signal is received into clock generator 210 of processor 200 (FIG. 2). The signal is buffered by input buffer 901A and enters phase detector 902 with the buffer feedback signal CLKINN (also buffered). Phase detector 902 outputs either an adjust up, ADJUP, or an adjust down, ADJDWN, signal. Charge pump 903 receives the signals and generates a charging or discharging current and supplies it to the capacitive elements of loop filter 904. This current charges or discharges the capacitive elements in loop filter 904, generating a control voltage. The control voltage produced is coupled to the VCNTL input to VCO 905.

The control voltage drives the output of VCO 905. As the control voltage increases, the frequency output by VCO 905 gets higher. As the control voltage decreases, the frequency output by VCO 905 gets lower. The output of VCO 905 is input into divide-by-two 906. Divide-by-two 906 divides the output frequency of VCO 905 to produce two outputs, PA and PB, wherein every rising edge of the CLK signal produces an edge, both rising and falling, for the output signal. These outputs are half the frequency of the output VCOOUT of VCO 905 and are non-overlapping pulses.

The PA and PB signals are the drivers for the PH2 and PH1 core clock signals respectively. The PA signal is delayed by delays 907B and 907A and is then input into control circuitry 930. The PB output signal is delayed by delay 907D and then is input into control circuitry 930. Control circuitry 930 outputs the EPH2 and EPH1 inputs to PH1/PH2 circuitry 914. The outputs of circuitry 914 are the core clock signals, PH2 and PH1.

The PA output, essentially the PH2 signal as output from delay 907B, produces the feedback signal CLKINN for clock generation circuitry 900 through AND gates 910A and 911 and delay 912. The feedback signal is the CLKIN signal produced by clock generation circuitry 900. When the PLL is in lock, the high going edges of the CLK signal and the CLKINN signal will be coincident. Upon chip power-up, the control voltage VCNTRL causes the VCO frequency to increase until the frequency of occurrence of the positive edges of the two inputs CLK and CLKINN to frequency/phase detector 902 are equal. The closed loop adjustment of the VCO frequency continues until the phase-error between the occurrence of the positive edges of CLK and CLKINN is at a minimum. The PLL is then in lock.

The AND gate 910A acts to either "swallow" the feedback signal or allow it to pass through depending on its input from OR gate 909A. During 2X mode, AND gate 910A (and AND gate 910B) masks every other clock signal. Therefore, the feedback signal being input into AND gate 911 is one-half the frequency of the feedback signal, i.e. one-half the frequency of the PH2 core clock signal during 2X mode. Inverter 913 is the other input to AND gate 911 and allows the feedback signal to pass through AND gate 911 when the PH1 signal, which is from the PB output of divide-by-two 906 buffered by delay 907D, is low. This ensures proper timing between the core clock signals and the bus clock signals.

The output of AND gate 911 is the CLKIN signal. In 1X mode, since the feedback signal is allowed to pass through AND gate 910A, the CLKIN signal is the same frequency as the PH2 core clock signal (and the PUPH2 clock signal). In 2X mode, since every other pulse of the feedback signal is masked, the CLKIN signal is one-half the frequency of the PH2 core clock signal. This is also the same relationship between the CLKOUT signal and the PH1 core clock signal (and PUPH1 clock signal), as output by AND gate 910B.

The CLKIN signal, i.e. the feedback signal, is delayed by delay 912 and fed back through the PLL by input buffer 901B. In 2X mode, since the feedback frequency is one-half the input CLK signal, charge pump 903 and loop filter 904 produce more voltage to compensate for the large difference between the frequencies of the CLK and CLKIN signals. The large control voltage produced causes VCO 905 to generate a higher frequency. A higher frequency from 905 produces the PH1 and PH2 core clock signals and the PUPH1 and PUPH2 clock signals that are higher in frequency. In this manner, the core clock signals of PH1 and PH2 and the PUPH1 and PUPH2 clock signals are generated by the present invention at twice (2X) the frequency of the CLK signal.

The operation of AND gate 910A is controlled by the output of OR gate 909A. Similarly, the operation of AND gate 910B is controlled by the output of OR gate 909B. When the outputs of OR gates 909A and 909B are low, then the outputs of AND gates 910A and 910B are low, thereby masking the clock signals received on their other inputs. When the outputs of OR gates 909A and 909B are high, then the other inputs of AND gates 910A and 910B are allowed to pass freely (with the exception of a small gate delay), such that the clock signals are not masked.

The outputs of OR gates 909A and 909B are controlled by each of their two inputs. One of the inputs to OR gates 909A and 909B are the Q outputs of D flip-flops 908A and 908B respectively. Furthermore, both OR gates 909A and 909B receive the MODE signal which sets the phase locked loop of clock generation circuitry 900 in its mode. In other words, the MODE signal permits the PLL to operate in 1X mode or another mode which produces core clock signals which have a frequency that is a multiple of the bus clock signals (i.e., 2X, 3X, 4X, etc.). In the currently preferred embodiment, the MODE signal selects either the 1X mode or the 2X mode. In the currently preferred embodiment, when the MODE signal is high (i.e., a logical 1), clock generation circuitry 900 is placed into 1X mode, and when the MODE signal is low (i.e., a logical 0), clock generation circuitry 900 is placed into 2X mode.

When clock generation circuitry 900 is in 1X mode, the output of OR gate 909A is always a logical 1. A logical 1 output from OR gate 909A causes the feedback signal to be passed through AND gate 910A without being masked. Moreover, the PB signal is passed through AND gate 910B as the CLKOUTA signal (and eventually the CLKOUT signal through AND gate 941). In this situation, the CLKOUT and CLKIN signals are the same frequency as the PH1 and PH2 core clock signals (and the PUPH1 and PUPH2 clock signals). Thus, the bus (FIG. 1) operates at the same frequency as the core of the processor (FIG. 2).

When clock generation circuitry 900 is switched into 2X mode, the output of OR gates 909A and 909B is determined by the output of D flip-flops 908A and 908B respectively. When the output of D flip-flop 908A is a logical 1, a logical 1 appears at AND gate 910A and allows the feedback signal to pass. When the output of D flip-flop 908A is a logical 0, a logical 0 appears at AND gate 910A, and AND gate 910A masks the feedback signal, thereby preventing it from passing through the gate. Similarly, when the output of D flip-flop 908B is a logical 1, a logical 1 appears at AND gate 910B and allows the output of the CLKOUTA signal, and when the output of D flip-flop 908B is a logical 0, a logical 0 appears at AND gate 910B, and AND gate 910B masks the CLKOUTA signal, thereby preventing it from passing through.

D flip-flops 908A and 908B are added as a second divide-by-two master/slave flip-flop. D flip-flops 908A and 908B are added off phase so that it is not in the critical path. The output of delay 907B clocks both D flip-flops 908A and 908B. However, the output of delay 907B clocks D flip-flops 908A and 908B on alternating clock pulses by having the clock input to D flip-flop 908A inverted upon receipt. Therefore, every other clock pulse of the output of delay 907B produces a logical 1 (or 0) output from D flip-flop 908A, while on the other clock pulses the output of delay 907B produces a logical 1 (or 0) output from D flip-flop 908B. Note that D flip-flops 908A and 908B produce alternating 1 and 0 outputs by being coupled with a feedback loop through inverter 915. When the D input of D flip-flop 908A is a 1 and D flip-flop 908A receives a low clock pulse (i.e., no clock signal) from delay 907B, its Q output is a 1. This Q output is then input into the D input of D flip-flop 908B, such that upon the next clock pulse, its Q output will be a 1. The Q output of 1 from D flip-flop 908B is inverted by inverter 915 and input to the D input of D flip-flop 908A, such that when the next clock pulse occurs, D flip-flop 908A will output a 0. The Q output of 0 is then feed into D flip-flop 908B. This feedback cycling is continuous.

Therefore, when clock generation circuitry 900 is in 2X mode, every other clock pulse of the output of delay 907B produces a logical 1 output from OR gate 909A, preventing AND gate 910A from allowing the feedback signal to pass through AND gate 910A. Furthermore, in this situation, AND gate 910B prevents the PB signal from passing through it as the CLKOUTA signal every other clock pulse such that the CLKOUT signal goes low. Therefore, both the CLKOUT and CLKIN signals are at half the frequency of the PH1 and PH2 core clock signals because half of the signal pulses are masked. However, even though they are half the frequency, the timing of the signals is exactly the same because the rising and falling edges of the bus clock signals, CLKIN and CLKOUT, are aligned with rising and falling edges of the core clock signals, PH2 and PH1, respectively (and the PUPH2 and PUPH1 clock signals respectively). Thus, in the currently preferred embodiment, the core of the processor (FIG. 2) is allowed to operate at twice the speed of the bus without changing the timing and without additional interface circuitry.

FIG. 10 illustrates timing signals associated with the operation of the clock generation circuitry 900. The use of the divide-by-two master/slave flip-flop (D flip-flops 908A and 908B) and the two AND gates (910A and 910B) provides the pulse-swallower functionality utilized by the present invention to generate the 2X core clock signals. The divide-by-two master/slave flip-flop generates the inhibit signals INH1 and INH2 that act as pulse swallowers for every other CLKOUTA (and, thus, the CLKOUT signal) and CLKIN. In the currently preferred embodiment, this causes the VCO frequency VCOOUT to be 4X that of the input clock frequency (i.e., EFl). Note that in FIG. 10, the CLKOUT and CLKIN signals are quarter duty cycle and have a correct timing relationship with the core clock signals.

Note that the clock signals which are output from delays 907A and 907C are not output directly to the core of the processor. The clock signals are input into control circuitry 930. In the present invention, control circuitry 930 is responsible for powering up and down the processor upon the appropriate internal or external request. In other words, control circuitry 930 is capable of placing the processor in and out of a reduced power consumption state. In the present invention, control circuitry 930 powers down the processor by disabling the PH1 and PH2 core clock signals, thereby preventing the clocking of the core of the processor. Upon receiving the appropriate power up request once in the power down mode, control circuitry 930 powers up the processor. In the currently preferred embodiment, control circuitry 930 powers up the processor by enabling the PH1 and PH2 core clock signals to the core. The powering up and down capability of control circuitry 930 includes the ability to power up the processor to compensate for actions taken by the computer system when the processor is in the power down mode (i.e., the reduced power consumption state). Once the processor performs the necessary actions in response to the actions of the remainder of the computer system, control circuitry 930 returns the processor to the reduced power consumption state.

In the currently preferred embodiment, the PH1 and PH2 core clock signals are disabled in response to either the SRLPD signal or the UNDC signal being asserted. The SRLPD signal is asserted when the processor receives a request to stop operation and power down (i.e., enter a reduced power consumption state). The UNDC signal is asserted when the processor is in the idle state (i.e., the state of no activity), such that the processor can be powered down. In the currently preferred embodiment, both the SRLPD and UNDC signals are active high. In the currently preferred embodiment, the EADSN signal enables the clock signals while in the power down mode, such that the processor is powered up and capable of performing its requisite functions and operations when the EADSN signal is asserted. In the currently preferred embodiment, the EADSN signal is active low.

Assuming the EADSN signal is high (i.e., not asserted), if either the SRLPD signal or the UNDC signal is asserted, then the output of OR gate 931 is high, thereby causing the output of AND gate 932 to be high. When the output of AND gate 932 is high, the EPH2 output of control circuitry 930 is always high. Also if either the SRLPD signal or the UNDC signal is asserted, then the output of inverter 934 is low. The output of inverter 934 being low results in the output of OR gate 936 to be low, thereby causing the output of AND gate to be low. Therefore, in the currently preferred embodiment, when either the SRLPD signal or the UNDC signal are asserted, such that the processor is in the power down mode, the EPH2 and EPH1 inputs to PH1/PH2 circuitry 914 are always high and low respectively, such that the PH2 core clock signal is always high and the PH1 core clock signal is always low. Note also that when the output of OR gate 936 is low, AND gate disables the CLKOUT signal, such that when the CLKOUT signal does not clock the output buffers of the processors when in the power down mode. Note also that even in the power down mode, the PUCOUT signal is still output from clock generator 900, such that the Hold Acknowlegement signal can be output when the processor is in the power-down mode. For more information on the use of the SRLPD signal and its generation, see concurrently filed co-pending application Ser. No. 08/036,530, entitled "Method and Apparatus for Powering Down an Integrated Circuit Transparently and its Phase Locked Loop," assigned to the assignee of the present invention.

Assuming that either the SRLPD signal or the UNDC signal is asserted and the processor is in the power down mode, if the EADSN signal is asserted, then the output of AND gate 932 is low, thereby causing OR gate 933 to act like a pass gate for the clock signal from delay 907A. In this manner, the EPH2 output from control circuitry 930 is the clock signal from delay 907A. Similarly, if the EADSN signal is asserted, then the output of inverter 935 is high, thereby causing OR gate 936 to output a high. The high output of OR gate 936 causes AND gate 937 to output the state of the clock signal received on its other input from delay 907C. The output of AND gate 937 is then input as the EPH1 input into PH1/PH2 circuitry 914. For more information on the use of the EADSN signal and its generation, see concurrently filed co-pending application Ser. No. 08/036, 470, entitled "Method and Apparatus for Invalidating a Cache While in a Low Power State," assigned to the assignee of the present invention.

Note that if either the SRLPD signal or the UNDC signals is asserted, the PLL of the present invention continues to run and remains in lock during the power down mode. In this manner, the PLL of the present invention is able to power up quickly since the PLL is already in lock.

PH1/PH2 circuitry 914 is the driver of the PH1 and PH2 core clock signals. The PH1 and PH2 core clock signals are driven in response to the EPH1 and EPH2 input clock signals respectively. The operation of PH1/PH2 circuitry 914 is well-known in the art. Note that in the power down state, the PH1 and PH2 core signals are placed in predetermined states, as discussed above.

PH1/PH2 circuitry 924 is the driver of the PUPH1 and PUPH2 clock signals. The PUPH1 and PUPH2 clock signals are driven directly from the outputs of delays 907C and 907A respectively. In the currently preferred embodiment, these signals are not powered down when the processor receives a stop request or an idle indication. Thus, the PUPH1 and PUPH2 clock signals are not placed in predetermined states when the processor is placed in the reduced power consumption state. The PUPH1 and PUPH2 clock signals clock the operation of the power down control logic of the present invention, such that the microprocessor is responsive to stop clock events when in the reduced power consumption state. Also the PUPH1 and PUPH2 clock signals are used to clock the synchronizers for the inputs during the power down mode. Note that although PH1/PH2 circuitry 924 and PH1/PH2 circuitry 914 have the same circuit structure, in the currently preferred embodiment, PH1/PH2 circuitry 924 is a smaller driver.

Clock generation circuitry 900 also includes EFl stop detect logic 931. EFl stop detect logic 931 detects the stoppage of the external clock signal (i.e., EFl) and disables VCO 905 and divide-by-two 906 once the external clock has been stopped using the STDBY signal.

Dynamic Idle Power Down

The present invention provides the capability to power down the processor of the present invention during every available idle cycle while waiting for a bus cycle to complete. By powering down during each available idle cycle, the present invention allows the processor to reduce its power consumption dynamically. In the present invention, the processor is powered down by dynamically powering down its internal clocks when a slow bus cycle (e.g., memory to I/O) is driven onto the bus. In the present invention, during the idle state power down, the internal PLL and I/O clocks are kept running for the duration of the external bus cycle. In this manner, the processor of the present invention is able to maintain normal processor operation. Thus, by powering down the processor during accesses to slow peripherals or memory in the computer system or any accesses to locations external to the processor, the present invention allows the power consumption of the processor to be reduced.

In the power down state of the present invention, the PLL of the processor is continuously running. Therefore, to place the processor in and out of the power down mode, the outputs of the PLL are enabled and disabled. The enabling and disabling of the outputs of the PLL are handled by control logic. In the currently preferred embodiment, this control logic is on-chip. In the present invention, the control logic enables and disables the core phases PH1 and PH2 and the I/O phases CLKOUT and CLKIN separately, such that in the power down mode, the control logic continues to allow the clocking of the I/O phases while freezing the core clocks. The present invention also includes additional control logic to determine when the processor is "quiescent" and is waiting for a bus cycle to complete. In the currently preferred embodiment, this additional control logic is on-chip and signals the control logic to disable the core clock phases. The present invention also includes control logic which determines when to power the processor back up after the idle state has ended.

In the currently preferred embodiment of the present invention, the processor is placed in the power down mode (i.e., the reduced power consumption state) using the UNDC signal. In the currently preferred embodiment, the UNDC signal is active high. Referring back to FIGS. 9A and 9B, when the UNDC signal is asserted, thereby indicating that the processor is to be placed in the power down mode, the PH1 and PH2 core clock signals are placed in predetermined states. By placing the PH1 and PH2 core clock signals in predetermined states, the core does not receive clock pulses to operate (except for those portions clocked by the PUPH1 and PUPH2 core clock signals).

In the currently preferred embodiment, when the UNDC signal is asserted, the output of OR gate 931 is high. Assuming that the EADSN signal is high (i.e., not asserted), then this causes the output of AND gate 932 to be high. When the output of AND gate 932 is high, the EPH2 signal output from control logic 930 is high, resulting in the PH2 core clock signal being high. Similarly when the UNDC signal is asserted, assuming the EADSN signal is high, both inverters 934 and 935 produce logical 0 outputs, causing OR gate 936 to output a logical 0 to AND gate 937. The logical 0 input to AND gate 937 results in control circuitry 930 always outputting the EPH1 signal being low, such that the PH1 core clock signal from driver circuitry 914 is always low. Thus, when the EADSN signal is asserted, the PH2 core clock signal is brought to a high state and the PH1 core clock signal is brought to a low state. By having each of the PH1 and PH2 core clock signals in predefined states, the portions of the processor receiving those signals are not clocked.

When the UNDC signal is de-asserted (and assuming the SRLDP signal and EADSN signal are de-asserted), the output of OR gate 931 goes low, such that the outputs of AND gate 932 and OR gate 936 are low and high respectively. In this manner, the clock signals from delays 907A and 907B are allowed to pass through control circuitry 930 uninhibited (with the exception of a minor gate delay).

Figure 11:
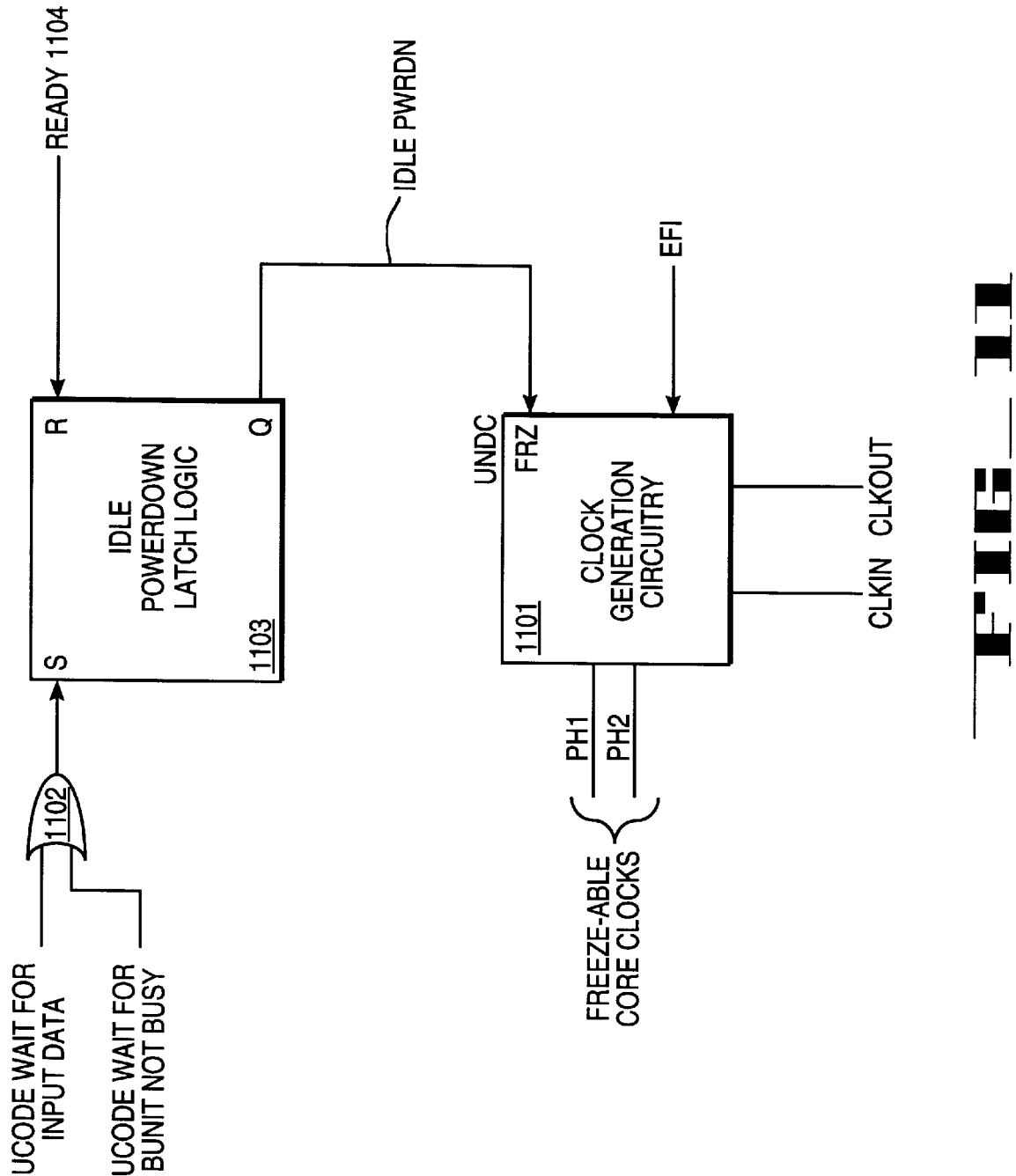
FIG. 11 is a block diagram of the circuitry used by the present invention to freeze the core clock signals.

In the present invention, the determination of whether the processor is quiescent (i.e., idle) is made by control logic within the processor (on-chip). FIG. 11 illustrates the control logic used in the present invention to detect the quiescent state of the processor. Referring to FIG. 11, clock generation circuitry 1101 is shown receiving the external clock signal EFl and a IDLE PWRDN signal. The IDLE PWRDN signal is coupled to the freeze (FRZ) signal input of clock generation circuitry 1101. In the currently preferred embodiment, the FRZ input comprises the UNDC input signal to control circuitry 930 (FIGS. 9A and 9B). In response to the EFl input signal, clock generation circuitry 1101 outputs the freeze-able core clocks PH1 and PH2 and the bus clock signals CLKIN and CLKOUT.

The IDLE PWRDN signal is the Q output of idle power down latch logic 1103. In the currently preferred embodiment, latch logic 1103 includes a S-R flip-flop. The READY signal 1104 is coupled to the reset (R) of latch logic 1103. The output of OR gate 1102 is coupled to the set (S) input of latch logic 1103. The inputs of OR gate 1102 are coupled to two signals. One signal input to OR gate 1102 indicates that the microcode is waiting for input data. The other input to OR gate 1102 indicates that the microcode is waiting for the bus controller to no longer be busy.

Idle power down latch logic 1103 and OR gate 1102 provide the necessary functionality to generate the IDLE PWRDN signal (i.e., the UNDC signal) to cause clock generation circuitry 1101 to freeze the core clock signals PH1 and PH2. In the currently preferred embodiment, the IDLE PWRDN signal causes clock generation circuitry 1101 to freeze the core clock signals PH1 and PH2 when it is asserted high. The IDLE PWRDN signal is high when the output of OR gate 1102 is high.

The output of OR gate 1102 is high when either the microcode is waiting for input data (i.e., resulting from a read operation) or the microcode is waiting for the bus controller to be not busy (resulting from a write operation). When the microcode prepares for the execution of an instruction, external memory may have to be accessed. A bus cycle is run to obtain the data to complete the access. However, depending on the number of wait states, the microcode may not be able to determine when the data will be available. In this case, the microcode checks the input latch every cycle and waits. That is, where the microcode is waiting for input and is sitting and waiting for a bus cycle to end (as indicated by the READY signal), the core of the processor continues to run. The microcode is waiting for the bus controller to be free (i.e., not busy) when an I/O write is executed by the microcode. The I/O write operation is performed by the bus controller, which runs a bus cycle. During the bus cycle, a busy signal indication is generated to indicate that the bus is busy. If either of the two conditions is met, then the IDLE PWRDN signal is high, thereby causing clock generation circuitry 1101 to disable the PH1 and PH2 core clock signals so that the processor of the present invention is placed into a low power consumption mode.

Note that in the low power consumption mode, the PH2 core clock signal is high and the PH1 core clock signal is low. One reason for placing the PH1 and PH2 core clock signals in these predefined states is that, in the currently preferred embodiment, data is input into the processor when PH2 is high. Therefore, once the data is available, it flows into the input latch of the processor. The decision as to whether to power down or up the core clock signals can be made in the middle of the PH2 clock. Also, all of the stop clock events, including the UNDC signal have synchronizes with four phases of display, wherein the stop clock events are clocked in by successive CLKIN, PUPH1, PUPH2, PUPH1 and PUPH2 clock phases. When powering back up the core clocks, the UNDC signal is taken after the third clock (i.e., the PUPH1 clock phase) and routed to the clock generator of the present invention. Therefore, by the time the UNDC signal proceeds through the fourth phase of delay, the core clocks are up and running. The effect of the one phase delay produced by deciding whether to assert (or de-assert) the UNDC signal is canceled by using the signal one phase earlier. That is, when the processor is powered back up again, the data in the latches is read into the PH1 logic, such that the processor continues as if it were never powered down, such that there is a zero latency difference.

Idle power down latch logic 1103 also provides the control logic necessary to determine when to power up the processor again. In the currently preferred embodiment, after the processor has been powered down due to an idle condition, the processor is powered up again when receiving an indication that the bus is ready via the READY signal 1104. Note that in the currently preferred embodiment, the READY signal 1104 is received by an input latch powered by the CLKIN signal. In the currently preferred embodiment, when the bus is busy, the READY signal is low. The low input on the reset (R) input of latch logic 1103 does not influence the Q output. However, once the READY signal is returned to high, thereby indicating that the bus is ready, the Q output of latch logic 1103 reset. When the 0 output is reset, the IDLE PWRDN signal goes low, causing clock generation circuitry 1101 to output the PH1 and PH2 core clock signals again. Also note that in the currently preferred embodiment, the READY signal is actually multiple ready signal inputs (e.g., one designated for the normal cycle, the burst cycle, an ICE cycle) which have been ORed together to generate a single signal.

It should be noted that in the currently preferred embodiment, the processor of the present invention is capable of accommodating burst transfers. In this case, the bus controller must determine the burst addresses one clock before the READY signal is generated. Therefore, by the time the READY signal is generated and the processor powers up, the address may be lost. To prevent losing data, the present invention enters a mode, referred herein as the undouble clutch mode. The undouble clutch mode is utilized only when the clock generation circuitry of the processor is set to provide core clock signals at a frequency which is some multiple (e.g., 2X, 3X, etc.) of the bus clock signals. In one embodiment, the undouble clutch mode is utilized when the core clock signals are set to operate at twice the frequency of the bus clock signals.

In undouble clutch mode, when the processor is in a quiescent (i.e., idle) state, the core is controlled such that it effectively runs at 1X, instead of 2X. In the present invention, the core is made to run at 1X by freezing every other clock pulse. In other words, every other clock pulse of the 2X clock is masked to clock the core at 1X. In the currently preferred embodiment, the clock pulses are frozen by toggling the UNDC signal every other clock. In the present invention, control logic determines which half of the bus cycle is to have an operational core (i.e., a clocked core). The PH2 and the following PH1 that are aligned with the CLKIN and CLKOUT are the phases that should toggle in order to facilitate bus operations. The UNDC signal is therefore asserted during the CLKIN (PH2) and de-asserted during the following PH2 (when CLKIN is low). A timing diagram depicting the undouble clutch mode is shown in FIG. 12. Referring to FIG. 12, note that the UNDC signal is asserted at the time of every other clock pulse of the PUPH2 clock signal. Specifically, the UNDC signal is asserted when the CLKIN and PUPH2 clock pulses are not aligned. As shown, the resulting effect on the PH2 clock signal is to stretch the PH2 clock pulse.

By employing the undouble clutch mode, the processor of the present invention is able to save almost half of the power that it would expend by remaining powered up when in the idle state. While in the 1X mode, only one clock is wasted because the core is being clocked half as often as when the clock pulses are at 2X. In other words, in the 2X mode, twice the number of clocks are wasted. Thus, by going to the 1X mode in the idle state, the power consumption can be reduced in half.

The present invention could be designed so that data is not lost. Data would be lost in a system which employs burst addressing because successive data blocks are sent. In this embodiment, circuit logic examines the burst addresses one clock phase before the READY signal is asserted. When the processor is placed into the power down mode, this circuit logic remains powered up using the PUPH1 and PUPH2 core clock signals. Portions of the logic which are necessary to remain powered up may have to be duplicated on-chip, such that each copy of the logic receives its own set of clock phases. These portions include programmable logic arrays (PLAs) found in the bus controller which are used in conjunction with the burst addressing in a manner well-known in the art. As stated above, because a decision to power down (or up) can be made in the middle of the PH2 pulse and the UNDC signal (asserted or de-asserted) is taken one phase earlier, there is a zero latency difference. Because the necessary portions of the logic, which must be powered up to ensure that no data is lost, receive clock signals when the processor is idle, any necessary signals may be latched in while the PH1 and PH2 core clock phases are frozen (i.e., disabled from the rest of the core). When the idle state is exited, the core clock phases are enabled to the core and no data is lost in the process. In this manner, the processor of the currently preferred embodiment is able to power down to approximately five percent of its fully operational power consumption level. Thus, the present invention is able to save power, which is especially important in the laptop and notebook computer markets.

Note that the present invention is able to enter and exit the reduced power consumption state transparently to the rest of the computer system, thereby reducing the power consumed by the internal core. Because it is transparent to the computer system, the processor of the present invention may be inserted into the computer system and provide the computer system with the added ability to reduce power consumption without having to change the circuit board of the computer system in any way. In this manner, one can upgrade the computer system and enhance performance solely by inserting a processor of the present invention.

Whereas many alterations and modifications of the present invention will no doubt become apparent to a person of ordinary skill in the art after having read the foregoing description, it is to be understood that the particular embodiment shown and described by way of illustration are in no way intended to be considered limiting. Therefore, reference to the details of the preferred embodiments are not intended to limit the scope of the claims which themselves recite only those features regarded as essential to the invention.

A method and apparatus for powering down an integrated circuit has been described.

We claim:

1. An integrated circuit for use in a computer system having a bus operating according to at least one bus clock signal and having a global clock signal at a first frequency, the integrated circuit comprising:

a phase locked loop (PLL) circuit coupled to receive the global clock signal to generate an internal clock at a second frequency that is at a predetermined multiple of the first frequency;

core logic means coupled to the PLL for processing data synchronously with the internal clock;

bus controller means coupled to the PLL circuit, the core logic means and the bus to transfer data between the core logic means and the bus in response to said at least one bus clock signal while the core logic means and the bus controller means operate at the clock speed of the internal clock:

detection logic means coupled to the core logic means for performing an on-chip determination of whether the core logic means is in a quiescent state;

control logic means coupled to the core logic means and the detection means for placing the core logic means in a reduced power consumption state in response to the detection logic means determining that the core logic means is in the quiescent state by disabling clocks from the PLL circuit to the core logic means while the PLL remains running and in lock and the core logic is in the reduced power consumption state.

2. The integrated circuit as defined in claim 1 wherein the control logic means comprises circuitry to determine when to exit the reduced power consumption state.

3. The integrated circuit as defined in claim 1 wherein the control logic means places the core logic means in the reduced power consumption state by disabling the internal clock from the core logic means.

4. The integrated circuit as defined in claim 1 wherein the control logic means places the core logic means in the reduced power consumption state by causing a phase of the internal clock that is received by the core logic means to remain in a predetermined logic state.

5. The integrated circuit defined in claim 1 wherein said PLL generates a first set of core clock signals and a second set of core clock signals, wherein the core logic means is placed in the reduced power consumption state by preventing the core logic means from being clocked by the first set of core clock signals while the second set of core clock signals clock operations of the control logic means.

6. The integrated circuit defined in claim 5 wherein said at least one bus clock signal clocks inputs while the core logic means is in the reduced power consumption state so that inputs are still received.

7. The integrated circuit defined in claim 6 wherein said second set of core clock signals clock inputs to the processing means in conjunction with said at least one bus clock signal while the core logic means is in the reduced power consumption state.

8. An integrated circuit for use in a computer system having a bus operating according to at least one bus clock signal and having a global clock signal at a first frequency, the integrated circuit comprising:

a phase locked loop (PLL) circuit coupled to receive the global clock signal to generate an internal clock at a second frequency that is at a predetermined multiple of the first frequency;

core logic means coupled to the PLL for processing data synchronously with the internal clock;

bus controller means coupled to the PLL circuit, the core logic means and the bus to transfer data between the core logic means and the bus in response to said at least one bus clock signal while the core logic means and the bus controller means operate at the clock speed of the internal clock;

detection logic means coupled to the core logic means for internally monitoring the core logic means to determine when the core logic means is in a quiescent state;

first control logic means coupled to the core logic means and the detection logic means for placing the core logic means in a reduced power consumption state in response to the detection logic means determining the core logic means is in the quiescent state, wherein the PLL continuously runs and remains in lock while in the reduced power consumption state; and second control means to determine when to exit the reduced power consumption state.

9. An integrated circuit for use in a computer system having a global clock signal at a first frequency and a bus, the integrated circuit comprising:

a phase locked loop (PLL) circuit coupled to receive the global clock signal for generating at least one core clock signal at a second frequency and at least one bus clock signal for clocking bus operations, wherein the second frequency is at a predetermined multiple of the first frequency;

core logic means coupled to the PLL for processing data synchronously with said at least one core clock signal;

bus controller means coupled to the PLL circuit, the core logic means and the bus to transfer data between the core logic means and the bus in response to said at least one bus clock signal while the core logic means and the bus controller means operate at the clock speed of the said at least one core clock signal;

detection logic means coupled to the core logic means for performing an on-chip determination of whether the core logic means is in a quiescent state;

first control logic means coupled to the core logic means and the detection logic means for placing the core logic means in a reduced power consumption state in response to the detection logic means determining the core logic means is in the quiescent state, wherein the first control logic means powers down the core logic means by disabling said at least one core clock signal from the core logic means while the PLL continuously runs and remains in lock in the reduced power consumption state; and second control means coupled to the core logic means for causing the core logic means to exit from the reduced power consumption state.

10. The integrated circuit as defined in claim 9 wherein the detection logic means determines that the core logic means is in the quiescent state when microcode is waiting for input data.

11. The integrated circuit as defined in claim 9 wherein the detection logic means determines that the core logic means is in the quiescent state when microcode is waiting for a bus controller to be not busy.

12. The integrated circuit as defined in claim 9 wherein the second control means comprises means for enabling said at least one core clock signal to the core logic means.

13. The integrated circuit as defined in claim 9 wherein the second control means causes the integrated circuit to exit the reduced power consumption state in response to microcode responding to a bus ready signal indication.

14. The integrated circuit defined in claim 9 wherein said at least one core clock signal comprises a first set of core clock signals and a second set of core clock signals, wherein the core logic means is placed in the reduced power consumption state by preventing the core logic means from being clocked by the first set of core clock signals while the second set of core clock signals clock operations of the control logic means.

15. An integrated circuit for use in a computer system having a bus and a global clock signal at a first frequency, the integrated circuit comprising:

a phase locked loop (PLL) circuit coupled to receive the global clock signal to generate at least one core clock signal at a second frequency and at least one bus clock signal for clocking bus operations, wherein the second frequency is at a predetermined multiple of the first frequency;

core logic means coupled to the PLL for processing data synchronously with said at least one core clock signal;

bus controller means coupled to the PLL circuit, the core logic means and the bus to transfer data between the core logic means and the bus in response to said at least one bus clock signal while the core logic means and the bus controller means operate at the clock speed of the said at least one core clock signal;

detection logic means coupled to the core logic means for on-chip monitoring the core logic means to determine when the core logic means is in a quiescent state, wherein said detection logic means determines the core logic means is in a quiescent state when microcode is waiting for input data or microcode is waiting for a bus controller to be not busy;

first control logic means coupled to the core logic means and the detection logic means for powering down the core logic means in response to the detection logic means determining the core logic means is in the quiescent state, wherein the control logic means powers down the core logic means by disabling said at least one core clock signal from the core logic means while the PLL continuously runs and remains in lock and wherein said at least one bus clock signal clocks bus operations while the core logic means is powered down; and second control means coupled to the core logic means for determining when to power the core logic means back up, wherein said second control means enables said at least one core clock signal to the core logic means in response to microcode responding to a bus ready signal indication.

16. The integrated circuit defined in claim 15 wherein said at least one core clock signal comprises a first set of core clock signals and a second set of core clock signals, wherein the core logic means is placed in the reduced power consumption state by preventing the core logic means from being clocked by the first set of core clock signals while the second set of core clock signals clock operations of the control logic means.

17. A processor for use in a computer system having a global clock signal at a first frequency and a bus, the integrated circuit comprising:

a phase locked loop (PLL) circuit coupled to the global clock signal for generating at least one core clock signal at a second frequency and at least one bus clock signal for clocking bus operations, wherein the second frequency is a predetermined multiple of the first frequency;

a bus controller coupled to the PLL circuit and core logic, and the bus to transfer data between the core logic and the bus in response to said at least one bus clock signal while the core logic and the bus controller operate at the clock speed of said at least one core clock signal;

a core logic coupled to the PLL and to process data synchronously with said at least one core clock signal;

a detection logic coupled to the core logic to determine on-chip when the core logic is in a quiescent state;

a first control logic coupled to the core logic and the detection logic to place the core logic in a reduced power consumption state in response to the detection logic determining that the core logic is in the quiescent state, wherein the control logic places the core logic in the reduced power consumption state by disabling said at least one core clock signal from the core logic while the PLL continuously runs and remains in lock; and a second control logic coupled to the core logic to place the core logic back into a powered up state.

18. The processor as defined in claim 17 wherein the detection logic determines that the core logic is in the quiescent state when microcode is waiting for input data.

19. The processor as defined in claim 17 wherein the detection logic determines that the core is in the quiescent state when microcode is waiting for a bus controller to be not busy.

20. The processor as defined in claim 17 wherein the second control logic enables said at least one core clock signal to the core logic.

21. The processor as defined in claim 17 wherein the second control logic places the core logic in the powered up state in response to microcode responding to a bus ready signal indication.

22. The integrated circuit defined in claim 17 wherein said at least one core clock signal comprises a first set of core clock signals and a second set of core clock signals, wherein the core logic is placed in the reduced power consumption state by preventing the core logic from being clocked by the first set of core clock signals while the second set of core clock signals clock operations of the control logic means.

23. A microprocessor for use in a computer system having a global clock signal at a first frequency, the microprocessor comprising:
- a continuously running phase locked loop (PLL) circuit coupled to the global clock signal for generating at least one core clock signal at a second frequency and at least one bus clock signal at a third frequency for clocking bus operations in response to the global clock signal, wherein the second frequency is a predetermined multiple of the first frequency and said third frequency;
- a core logic coupled to the PLL to execute instructions synchronously with said at least one core clock signal;
- a bus controller coupled to the PLL circuit and core logic, and the bus to transfer data between the core logic and the bus in response to said at least one bus clock signal while the core logic and the bus controller operate at the clock speed of said at least one core clock signal:
- a first control logic coupled to the PLL for allowing and preventing said at least one core clock signal from clocking the core logic, such that at least one bus clock signal clocks bus operations while said at least one core clock signal is prevented from clocking the core logic;
- a second control logic coupled to the core logic to determine when the core logic is idle;
- wherein said first control logic scales back the second frequency to a multiple of the first frequency less than the predetermined multiple by enabling and disabling said at least one core clock signal on alternating clock cycles by masking every other pulse of said at least one core clock signal when the second control logic determines that the core logic is idle, such that said at least one core clock signal runs at half of the second frequency when the core logic is idle.

24. The microprocessor as defined in claim 23 wherein the first control logic includes means for supplying the core logic such that said at least one core clock signal is in a predetermined logic state.

25. The microprocessor as defined in claim 23 further comprising a third control logic to determine when to power the core logic back up, wherein said third control logic enables said at least one core clock signal to the core logic such that said at least one core clock signal returns to being a predetermined multiple of said at least one bus clock signal.

26. The microprocessor as defined in claim 25 wherein the third control logic powers the core logic back up in response to a bus ready signal indication.

27. The microprocessor as defined in claim 23 wherein the second control logic determines that the core logic is in a quiescent state when microcode is waiting for input data.

28. The microprocessor as defined in claim 23 wherein the logic determines that the core is in a quiescent state when microcode is waiting for a bus controller to be not busy.

29. A method for internally powering down a microprocessor having a bus controller for communicating with a bus in a computer system, the method comprising:
- continuously running a phase locked loop, wherein the phase locked loop generates at least one core clock signal at a first frequency for clocking core logic in the microprocessor and at least one bus clock signal at a second frequency for clocking bus operations, wherein the first frequency is a multiple of the second frequency;
- transferring data between the core logic and the bus in response to said at least one bus clock signal while the core logic and bus controller operate at the clock speed of said at least one core clock signal:
- on-chip monitoring the core logic to determine when the core logic of the microprocessor is in a quiescent state; and
- scaling back frequency of said at least one core clock signal to be less than the first frequency while remaining a multiple of the second frequency, wherein scaling back comprises disabling said at least one core clock signal every other clock cycle by masking every other clock cycle when the core logic is in the quiescent state, such that the first frequency is equal to the second frequency.

30. An integrated circuit for use in a computer system having a bus operating according to at least one bus clock signal and having a global clock signal at a first frequency, the integrated circuit comprising:
- a phase locked loop (PLL) circuit coupled to receive the global clock signal to generate an internal clock at a second frequency that is at a predetermined multiple of the first frequency;
- core logic coupled to the PLL circuit that processes data synchronously with the internal clock;
- a bus controller coupled to the PLL circuit, the core logic and the bus to transfer data between the core logic and the bus in response to said at least one bus clock signal while the core logic and the bus controller operate at the clock speed of the internal clock,
- detection logic coupled to the core logic to perform an on-chip determination of whether the core logic is in a quiescent state;
- control logic coupled to the core logic and the detection, wherein the control logic places the core logic in a reduced power consumption state in response to the detection logic determining that the core logic is in the quiescent state by disabling clocks from the PLL circuit to the core logic while the PLL remains running and in lock and the core logic is in the reduced power consumption state.

31. The integrated circuit as defined in claim 30 wherein the control logic comprises circuitry to determine when to exit the reduced power consumption state.

32. The integrated circuit as defined in claim 30 wherein the control logic places the core logic in the reduced power consumption state by disabling the internal clock from the core logic.

33. The integrated circuit as defined in claim 30 wherein the control logic places the core logic in the reduced power consumption state by causing a phase of the internal clock that is received by the core logic to remain in a predetermined logic state.

34. An integrated circuit for use in a computer system having a bus operating according to at least one bus clock signal and having a global clock signal at a first frequency, the integrated circuit comprising:

a phase locked loop (PLL) circuit coupled to receive the global clock signal to generate an internal clock at a second frequency that is at a predetermined multiple of the first frequency;

core logic coupled to the PLL for processing data synchronously with the internal clock;

a bus controller coupled to the PLL circuit, the core logic and the bus to transfer data between the core logic and the bus in response to said at least one bus clock signal while the core logic and the bus controller operate at the clock speed of the internal clock;

detection logic coupled to the core logic to internally monitor the core logic to determine when the core logic is in a quiescent state;

first control logic coupled to the core logic and the detection logic to place the core logic in a reduced power consumption state in response to the detection logic determining the core logic is in the quiescent state, wherein the PLL continuously runs and remains in lock while in the reduced power consumption state; and second control to determine when to exit the reduced power consumption state.

35. An integrated circuit for use in a computer system having a bus and a global clock signal at a first frequency, the integrated circuit comprising:

a phase locked loop (PLL) circuit coupled to receive the global clock signal to generate at least one core clock signal at a second frequency and at least one bus clock signal for clocking bus operations, wherein the second frequency is at a predetermined multiple of the first frequency;

core logic coupled to the PLL for processing data synchronously with said at least one core clock signal;

a bus controller coupled to the PLL circuit, the core logic and the bus to transfer data between the core logic and the bus in response to said at least one bus clock signal while the core logic and the bus controller operate at the clock speed of said at least one core clock signal;

detection logic coupled to the core logic to provide on-chip monitoring of the core logic, wherein said detection logic determines the core logic is in a quiescent state when microcode is waiting for input data or microcode is waiting for a bus controller to be not busy;

first control logic coupled to the core logic and the detection logic for powering down the core logic in response to the detection logic determining the core logic is in the quiescent state, wherein the control logic powers down the core logic by disabling said at least one core clock signal from the core logic while the PLL continuously runs and remains in lock and wherein said at least one bus clock signal clocks bus operations while the core logic is powered down; and second control coupled to the core logic for determining when to power the core logic back up, wherein said second control enables said at least one core clock signal to the core logic in response to a bus ready signal indication.

* * * * *

UNITED STATES PATENT AND TRADEMARK OFFICE
CERTIFICATE OF CORRECTION

PATENT NO.   : 5,935,253
DATED        : August 10, 1999
INVENTOR(S)  : Conary et al.

It is certified that error appears in the above-identified patent and that said Letters Patent is hereby corrected as shown below:

Column 6,
Line 58, after "generator", delete "2", insert -- 210 --.

Column 8,
Line 39, delete "Ti", insert -- T1 --.

Column 9,
Line 18, before "output", delete "0", insert -- Q --.

Column 14,
Line 20, delete "Voc", insert -- Vcc --.

Column 22,
Line 12, after "When the", delete "0", insert -- Q --.

Signed and Sealed this

Fourteenth Day of October, 2003

JAMES E. ROGAN
*Director of the United States Patent and Trademark Office*